US009452879B2

(12) United States Patent
Fu et al.

(10) Patent No.: US 9,452,879 B2
(45) Date of Patent: Sep. 27, 2016

(54) SEALED BEVERAGE BASKET AND METHOD OF MAKING

(71) Applicant: LBP MANUFACTURING LLC, Cicero, IL (US)

(72) Inventors: Thomas Z. Fu, Naperville, IL (US); Matthew R. Cook, Oak Brook, IL (US)

(73) Assignee: LBP Manufacturing LLC, Cicero ( * ) Notice: Subject to any disclaimer, the term of this patent is extended or adjusted under 35 U.S.C. 154(b) by 791 days.

(21) Appl. No.: 13/624,169

(22) Filed: Sep. 21, 2012

(65) Prior Publication Data
US 2013/0025466 A1    Jan. 31, 2013

Related U.S. Application Data

(63) Continuation-in-part of application No. 13/191,219, filed on Jul. 26, 2011, now Pat. No. 9,108,794.

(60) Provisional application No. 61/538,623, filed on Sep. 23, 2011.

(51) Int. Cl.
*A47G 19/14* (2006.01)
*B65D 85/804* (2006.01)
(Continued)

(52) U.S. Cl.
CPC ............ *B65D 85/8043* (2013.01); *A47J 31/08* (2013.01); *A47J 31/368* (2013.01); *Y10T 29/49826* (2015.01)

(58) Field of Classification Search
CPC ... A47G 19/16; A47J 31/3695; B65B 29/06; B65D 85/804; B65D 85/8043; B65D 85/8046; B65D 85/816

USPC .............. 99/295, 323; 426/77–84, 115, 394, 426/594–596
See application file for complete search history.

(56) References Cited

U.S. PATENT DOCUMENTS

| 2,224,378 A | 12/1940 | Coniglio |
| 2,224,409 A | 12/1940 | Schleyer |
| 2,743,664 A | 5/1956 | Dale |

(Continued)

FOREIGN PATENT DOCUMENTS

| CA | 2010954 A1 | 8/1991 |
| CN | 2425039 Y | 3/2001 |

(Continued)

OTHER PUBLICATIONS

Official Action, dated Sep. 16, 2014, for corresponding Japanese Application No. 2012-532233 (7 pages).

(Continued)

*Primary Examiner* — Dana Ross
*Assistant Examiner* — Brandon Harvey
(74) *Attorney, Agent, or Firm* — Dinsmore & Shohl LLP

(57) ABSTRACT

A basket for holding beverage grounds includes a frame. The frame includes a continuous rim that defines an opening at a top of the frame, a bottom portion that is closed, and a plurality of spaced apart ribs that extend from the rim to a peripheral edge of the bottom portion. The bottom edge, plurality of ribs and rim define a plurality of openings that facilitate fluid flow. A filter material is positioned in the plurality of openings. A removable outer sleeve is formed on an outside surface of the frame. The outer sleeve is configured to cover at least the plurality of openings to thereby provide an air-tight seal within the frame.

16 Claims, 18 Drawing Sheets

(51) Int. Cl.
*A47J 31/08* (2006.01)
*A47J 31/36* (2006.01)

(56) References Cited

U.S. PATENT DOCUMENTS

| | | |
|---|---|---|
| 2,885,290 A | 5/1959 | Krasker |
| 2,968,560 A | 1/1961 | Goros |
| 3,483,812 A | 12/1969 | Gast |
| 3,592,126 A | 7/1971 | Dombrowik |
| 3,811,373 A | 5/1974 | Telco |
| 3,935,112 A | 1/1976 | Greutert |
| 4,052,318 A | 10/1977 | Krebs |
| 4,271,024 A | 6/1981 | Kawolics et al. |
| 4,382,861 A | 5/1983 | Adeboi et al. |
| 270,513 A | 9/1983 | Wallsten |
| 4,471,689 A | 9/1984 | Piana |
| 4,522,298 A | 6/1985 | Weinberger |
| 4,626,435 A | 12/1986 | Zimmerman |
| 4,756,915 A | 7/1988 | Dobry |
| 4,832,845 A | 5/1989 | Hendretti |
| 4,859,337 A | 8/1989 | Woltermann |
| 4,882,055 A | 11/1989 | Stamstad |
| 4,886,674 A | 12/1989 | Seward |
| 5,011,023 A | 4/1991 | Arai |
| 5,012,629 A | 5/1991 | Rehman |
| 5,082,676 A | 1/1992 | Love |
| 5,108,768 A | 4/1992 | So |
| 5,125,327 A | 6/1992 | Winnington-Ingram |
| 5,197,374 A | 3/1993 | Fond |
| 5,207,341 A | 5/1993 | Yeager |
| 5,243,164 A | 9/1993 | Erickson |
| 5,266,194 A | 11/1993 | Chiodo |
| 5,277,103 A | 1/1994 | Cox |
| 5,298,267 A | 3/1994 | Gruenbacher |
| 5,325,765 A | 7/1994 | Sylvan et al. |
| 349,211 A | 8/1994 | Cerato |
| 5,347,916 A | 9/1994 | Fond |
| 5,424,083 A | 6/1995 | Lozito |
| 5,520,093 A * | 5/1996 | Ackermann ............... 99/289 T |
| 5,605,710 A | 2/1997 | Pridonoff |
| 5,633,026 A | 5/1997 | Gruenbacher |
| 5,637,335 A | 6/1997 | Fond |
| 5,738,786 A | 4/1998 | Winnington-Ingram |
| 5,758,473 A | 6/1998 | Patelli |
| 5,776,527 A | 7/1998 | Blanc |
| 5,840,189 A | 11/1998 | Sylvan et al. |
| D408,679 S | 4/1999 | Britt |
| 5,895,672 A | 4/1999 | Cooper |
| 5,948,455 A | 9/1999 | Schaeffer |
| 5,967,019 A | 10/1999 | Johnson |
| 6,076,450 A | 6/2000 | DiGiorgio |
| 6,079,315 A | 6/2000 | Beaulieu et al. |
| 6,082,247 A | 7/2000 | Beaulieu |
| 6,142,063 A | 11/2000 | Beaulieu |
| 6,182,554 B1 | 2/2001 | Beaulieu et al. |
| 6,283,013 B1 | 9/2001 | Romandy |
| D452,433 S | 12/2001 | Lazaris |
| D452,434 S | 12/2001 | Sweeney |
| 6,440,256 B1 | 8/2002 | Gordon et al. |
| D462,865 S | 9/2002 | Honan |
| 6,485,766 B2 | 11/2002 | Herod |
| 6,517,880 B2 | 2/2003 | Walters et al. |
| D474,110 S | 5/2003 | Sweeney |
| D474,111 S | 5/2003 | Lazaris |
| 6,589,577 B2 | 7/2003 | Lazaris et al. |
| 6,606,938 B2 | 8/2003 | Taylor |
| 6,607,762 B2 | 8/2003 | Lazaris et al. |
| 6,644,173 B2 | 11/2003 | Lazaris et al. |
| 6,645,537 B2 | 11/2003 | Sweeney et al. |
| 6,655,260 B2 | 12/2003 | Lazaris et al. |
| 6,658,989 B2 | 12/2003 | Sweeney et al. |
| 6,662,955 B1 | 12/2003 | Lassota |
| 6,666,130 B2 | 12/2003 | Taylor et al. |
| 6,672,200 B2 | 1/2004 | Duffy |
| 6,708,600 B2 | 3/2004 | Winkler et al. |
| D489,215 S | 5/2004 | Honan |
| 6,740,345 B2 | 5/2004 | Cai |
| 6,758,130 B2 | 7/2004 | Sargent |
| D494,811 S | 8/2004 | Rossi |
| 6,777,007 B2 | 8/2004 | Cai |
| 6,786,134 B2 | 9/2004 | Green |
| 6,810,788 B2 | 11/2004 | Hale |
| 6,844,015 B2 | 1/2005 | Yuguchi |
| D502,362 S | 3/2005 | Lazaris et al. |
| 6,861,086 B2 | 3/2005 | Buckingham |
| 6,948,420 B2 | 9/2005 | Kirschner |
| D513,572 S | 1/2006 | Schaffeld |
| 7,081,263 B2 | 7/2006 | Albrecht |
| 7,165,488 B2 | 1/2007 | Bragg et al. |
| 7,213,506 B2 | 5/2007 | Halliday |
| D544,299 S | 6/2007 | Schaffeld |
| 7,311,037 B2 | 12/2007 | Albrecht |
| D564,832 S | 3/2008 | Bodum |
| 7,347,138 B2 | 3/2008 | Bragg et al. |
| 7,360,418 B2 | 4/2008 | Pelovitz |
| 7,377,162 B2 | 5/2008 | Lazaris |
| 7,398,726 B2 | 7/2008 | Streeter |
| 7,412,921 B2 | 8/2008 | Hu |
| 7,490,542 B2 | 2/2009 | Macchi |
| 7,513,192 B2 | 4/2009 | Sullivan et al. |
| 7,523,695 B2 | 4/2009 | Streeter |
| 7,543,527 B2 | 6/2009 | Schmed |
| 7,552,672 B2 | 6/2009 | Schmed |
| 7,624,673 B2 | 12/2009 | Zanetti |
| 7,640,845 B2 | 1/2010 | Woodnorth |
| 7,836,819 B2 | 11/2010 | Suggi |
| D637,484 S | 5/2011 | Winkler |
| 8,039,029 B2 | 10/2011 | Ozanne |
| 8,039,034 B2 | 10/2011 | Ozanne |
| 8,221,813 B2 | 7/2012 | Boul |
| 2004/0045443 A1 | 3/2004 | Lazaris et al. |
| 2004/0115317 A1 | 6/2004 | Doglioni |
| 2004/0118295 A1* | 6/2004 | Angeles ..................... 99/279 |
| 2004/0149135 A1* | 8/2004 | Cai ............................. 99/275 |
| 2004/0159075 A1 | 8/2004 | Matthews |
| 2004/0182250 A1 | 9/2004 | Halliday et al. |
| 2005/0051478 A1 | 3/2005 | Karanikos et al. |
| 2005/0056153 A1 | 3/2005 | Nottingham et al. |
| 2005/0205601 A1 | 9/2005 | Taylor |
| 2005/0266122 A1 | 12/2005 | Franceschi |
| 2005/0287251 A1 | 12/2005 | Lazaris |
| 2006/0021930 A1 | 2/2006 | Cai |
| 2006/0057257 A1 | 3/2006 | Ma |
| 2006/0099393 A1 | 5/2006 | Woodman et al. |
| 2006/0169149 A1 | 8/2006 | Voss |
| 2006/0174773 A1 | 8/2006 | Taylor |
| 2006/0230944 A1 | 10/2006 | Neace et al. |
| 2006/0236871 A1 | 10/2006 | Ternite |
| 2006/0292012 A1 | 12/2006 | Brudevold |
| 2007/0056994 A1 | 3/2007 | Woodnorth et al. |
| 2007/0089614 A1 | 4/2007 | Tremblay |
| 2007/0125238 A1 | 6/2007 | Urquhart et al. |
| 2007/0221066 A1 | 9/2007 | Sullivan et al. |
| 2008/0060751 A1* | 3/2008 | Arrindell ................... 156/248 |
| 2008/0095904 A1 | 4/2008 | Sullivan et al. |
| 2008/0115674 A1 | 5/2008 | Huang et al. |
| 2008/0134902 A1 | 6/2008 | Zimmerman et al. |
| 2008/0251518 A1 | 10/2008 | Tee |
| 2008/0264267 A1 | 10/2008 | Doglioni |
| 2009/0007792 A1 | 1/2009 | Glucksman et al. |
| 2009/0056557 A1 | 3/2009 | Lin |
| 2009/0173043 A1 | 7/2009 | Bloome |
| 2009/0229470 A1 | 9/2009 | Dorfmueller |
| 2009/0260521 A1 | 10/2009 | Tatsuno |
| 2010/0024658 A1 | 2/2010 | Jacobs |
| 2010/0028495 A1 | 2/2010 | Novak |
| 2010/0043644 A1 | 2/2010 | Suggi |
| 2010/0043645 A1 | 2/2010 | Suggi |
| 2010/0043646 A1 | 2/2010 | Suggi |
| 2010/0077928 A1 | 4/2010 | Schmed |
| 2010/0093245 A1 | 4/2010 | Bradley et al. |

(56) References Cited

U.S. PATENT DOCUMENTS

| | | |
|---|---|---|
| 2010/0282091 A1 | 11/2010 | Doleac |
| 2010/0288131 A1 | 11/2010 | Kilber |
| 2010/0303964 A1 | 12/2010 | Beaulieu |
| 2010/0320206 A1* | 12/2010 | Caldwell et al. .............. 220/266 |
| 2011/0030563 A9 | 2/2011 | Doglioni |
| 2011/0064852 A1 | 3/2011 | Mann |
| 2011/0070385 A1 | 3/2011 | Jahani |
| 2011/0073607 A1 | 3/2011 | Fu et al. |
| 2011/0076361 A1 | 3/2011 | Peterson |
| 2011/0127319 A1 | 6/2011 | Golden |
| 2011/0142996 A1 | 6/2011 | Kruger |
| 2011/0151075 A1 | 6/2011 | Peterson |
| 2011/0168029 A1 | 7/2011 | Fulco |
| 2011/0183043 A1 | 7/2011 | Reati |
| 2011/0185911 A1 | 8/2011 | Rapparini |
| 2011/0226343 A1 | 9/2011 | Novak |
| 2012/0058226 A1 | 3/2012 | Winkler |

FOREIGN PATENT DOCUMENTS

| | | |
|---|---|---|
| CN | 2727099 Y | 9/2005 |
| FR | 2213757 | 8/1974 |
| GB | 1348370 | 3/1974 |
| JP | 556-000664 U1 | 1/1981 |
| JP | H06-113952 A | 4/1994 |
| JP | H08-244836 A | 9/1996 |
| JP | H09-000451 A | 1/1997 |
| JP | 3141054 U | 4/2008 |
| JP | 2009011420 A | 1/2009 |
| WO | 9307791 A1 | 4/1993 |
| WO | 2008029265 A2 | 3/2008 |

OTHER PUBLICATIONS

Definitions of "bond" & "bonded" from dictionary.com, printed Jul. 10, 2014 (2 pages).

International Search Report and Written Opinion of the International Searching Authority mailed Nov. 19, 2010, for corresponding International Application No. PCT/US2010/050505.

International Search Report and Written Opinion for PCT/US2012/55910, mailed Dec. 11, 2012.

International Search Report and Written Opinion of the International Searching Authority for PCT/US2012/47835, mailed Jan. 8, 2013.

Plastic coffee ground basket with metal mesh, and holder for same, for Breville Brewer, product available prior to earliest application filing date.

Office Action for corresponding Singapore application 201202280-2, mailed Mar. 6, 2013.

First, Second, and Third official action by the Canadian Intellectual Property Office, dated Feb. 11, 2013, Jul. 23, 2014, and Oct. 8, 2014 respectively, for related pending Canadian Patent Application No. 2,776,150, filed Sep. 28, 2010, (8 pages).

My K-Cup: Keurig Single-Cup Coffee Headquarters—Coffee, Brewers, and Accessories, Jul. 26, 2006, (retrieved by the Canadian Patent Examiner on Jan. 5, 2014 from www.mykcup.com, (2 pages).

Official Action (English translation not available) dated Jul. 17, 2015 for corresponding Chinese Patent Application No. 201280052073.4 (12 pages).

Official Final Action by the United States Patent & Trademark Office, dated Jan. 27, 2015, in the parent U.S. Appl. No. 12/889,144, filed Sep. 23, 2010 (20 pages).

Official Communication issued in corresponding EP Appln. No. 12833059.4, dated Jun. 24, 2016.

* cited by examiner

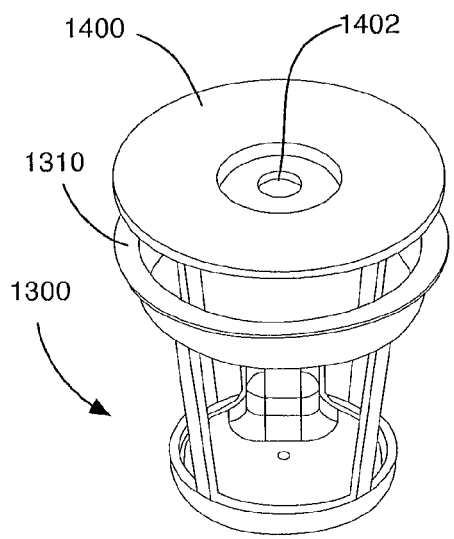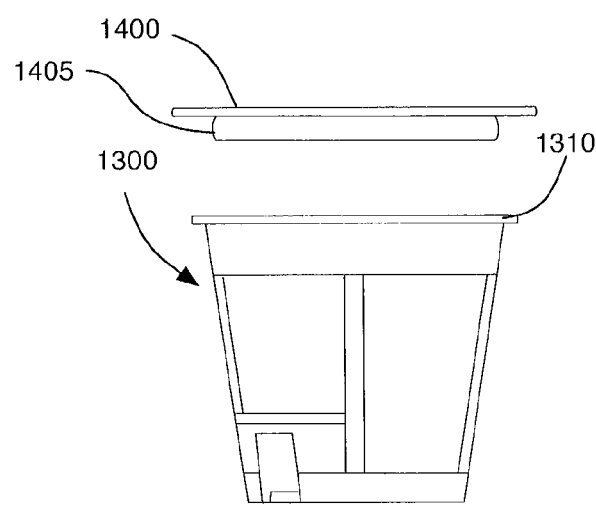
FIG. 14A          FIG. 14B
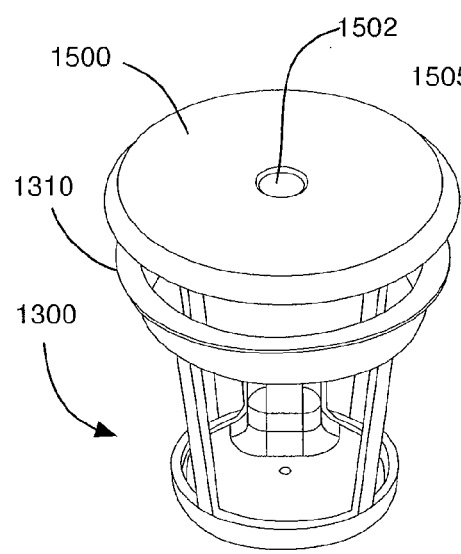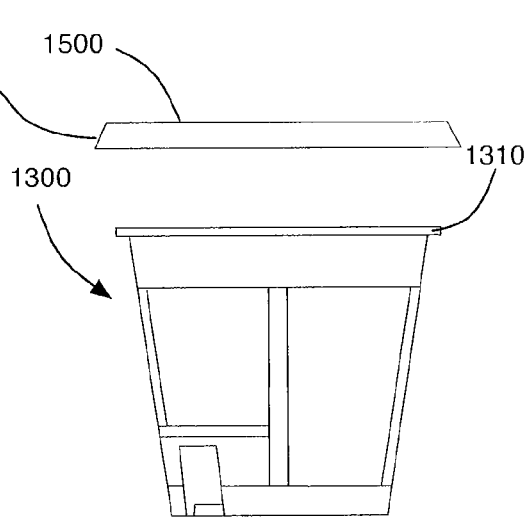
FIG. 15A          FIG. 15B

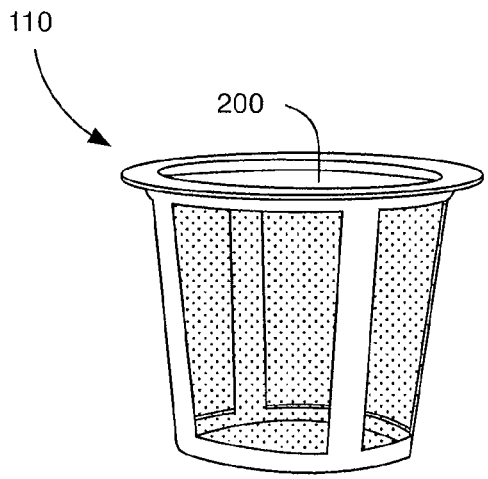
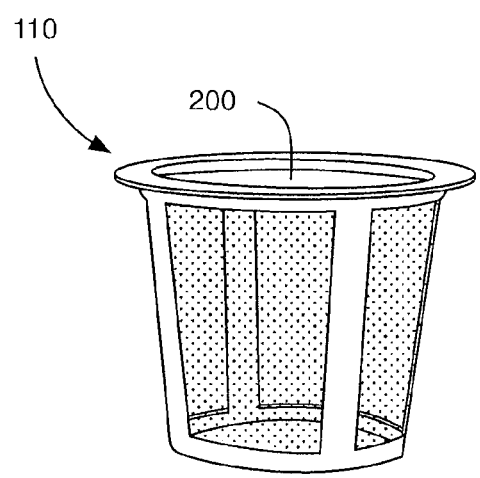
FIG. 19A
FIG. 19B
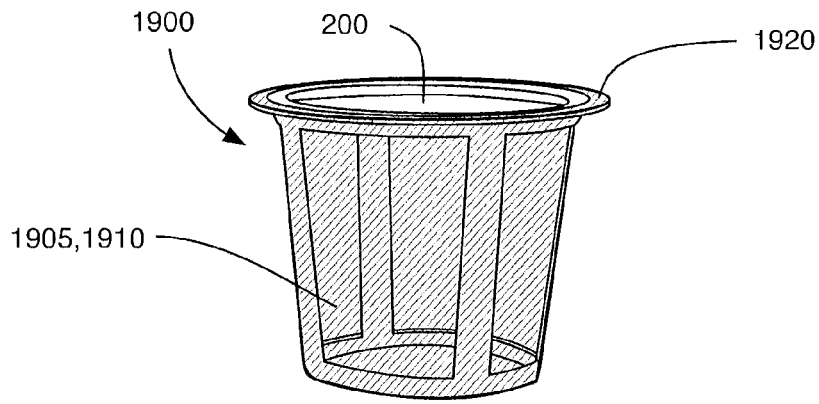
FIG. 19C

SEALED BEVERAGE BASKET AND METHOD OF MAKING

RELATED APPLICATIONS

This application claims the benefit of the filing date under 35 U.S.C. §119 to U.S. Provisional Application No. 61/538,623, filed Sep. 23, 2011, and is also a continuation-in-part of U.S. application Ser. No. 13/191,219, filed Jul. 26, 2011, which is a continuation-in-part of U.S. application Ser. No. 12/889,144, filed Sep. 23, 2010, which claims the benefit of the filing date under 35 U.S.C. §119 to U.S. Provisional Application No. 61/246,796, filed Sep. 29, 2009, the contents of all of which are hereby incorporated by reference in their entirety.

BACKGROUND

Single serve beverage brewing is popular among consumers. There are many formats of single serve brewers on the market. These brewers are designed to quickly brew a single cup of coffee or tea. The coffee or tea grounds are sold in prepared, single serving portions.

Reusable devices for single serve brewers, such as devices with metal or steal filters, may not suitable in some situations. For example, when efficiency is required such as in a busy home, in an office environment, or in a waiting-room environment. Reusable devices require cleaning, which may be complicated by the tendency of beverage grounds to cake into the filter openings. Additionally, to accommodate cleaning of reusable devices, the single serve brewer will be required to be placed near a source of water and a sink or drain. Provision of a sink or drain may be impracticable.

BRIEF SUMMARY

In a first aspect, a basket for holding beverage grounds includes a frame. The frame includes a continuous rim that defines an opening at a top of the frame, a bottom portion that is closed, and a plurality of spaced apart ribs that extend from the rim to a peripheral edge of the bottom portion. The bottom edge, plurality of ribs, and rim define a plurality of openings that facilitate fluid flow. A filter material is positioned in the plurality of openings. A removable outer sleeve is formed on an outside surface of the frame. The outer sleeve is configured to cover at least the plurality of openings to thereby provide an air-tight seal within the frame.

In a second aspect, a beverage package includes a flow wrap material that defines a plurality of sealed pockets, and a beverage basket for storing beverage grounds positioned within each sealed pocket. Each beverage basket includes a frame. The frame includes a continuous rim that defines an opening at a top of the frame, a bottom portion that is closed, and a plurality of spaced apart ribs that extend from the rim to a peripheral edge of the bottom portion. The bottom edge, plurality of ribs, and rim define a plurality of openings that facilitate fluid flow. The beverage basket also includes a filter material positioned in the plurality of openings. A removable outer sleeve is formed on an outside surface of the frame configured to cover at least the plurality of openings to thereby provide an air-tight seal within the frame.

In a third aspect, a method for forming a beverage basket for holding beverage grounds includes forming a frame that includes a continuous rim that defines an opening at a top of the frame, a bottom portion that is closed, and a plurality of spaced apart ribs that extend from the rim to a peripheral edge of the bottom. The bottom portion, plurality of ribs, and rim define a plurality of openings that facilitate fluid flow. A filter material is positioned in the plurality of openings. A removable outer sleeve is formed on an outside surface of the frame and is configured to cover at least the plurality of openings to thereby provide an air-tight seal within the frame.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

FIGS. 14A and 14B illustrate a first lid embodiment for covering the beverage basket of FIGS. 13A-13C.

FIGS. 15A and 15B illustrate a second lid embodiment for covering the beverage basket of FIGS. 13A-13C.

FIG. 19A illustrates application of a first exemplary sleeve embodiment over a beverage basket.

FIG. 19B illustrates application of a second exemplary sleeve embodiment over a beverage basket.

FIG. 19C illustrates a sealed beverage basket embodiment.

DETAILED DESCRIPTION OF THE DRAWINGS

Single serve beverage brewing is popular among consumers due to the convenience and flexibility that it provides. Many single serve beverage brewers have entered the market. Traditional brewers typically produce between four and twenty cups of beverage at a time. The beverage sits on a hot plate until it is consumed. As time passes, the taste of the beverage may decline. Single serve brewing allows a consumer to enjoy beverages, such as coffee and tea, in an efficient fashion and without a decline in the taste profile of the beverage.

Figure 1:
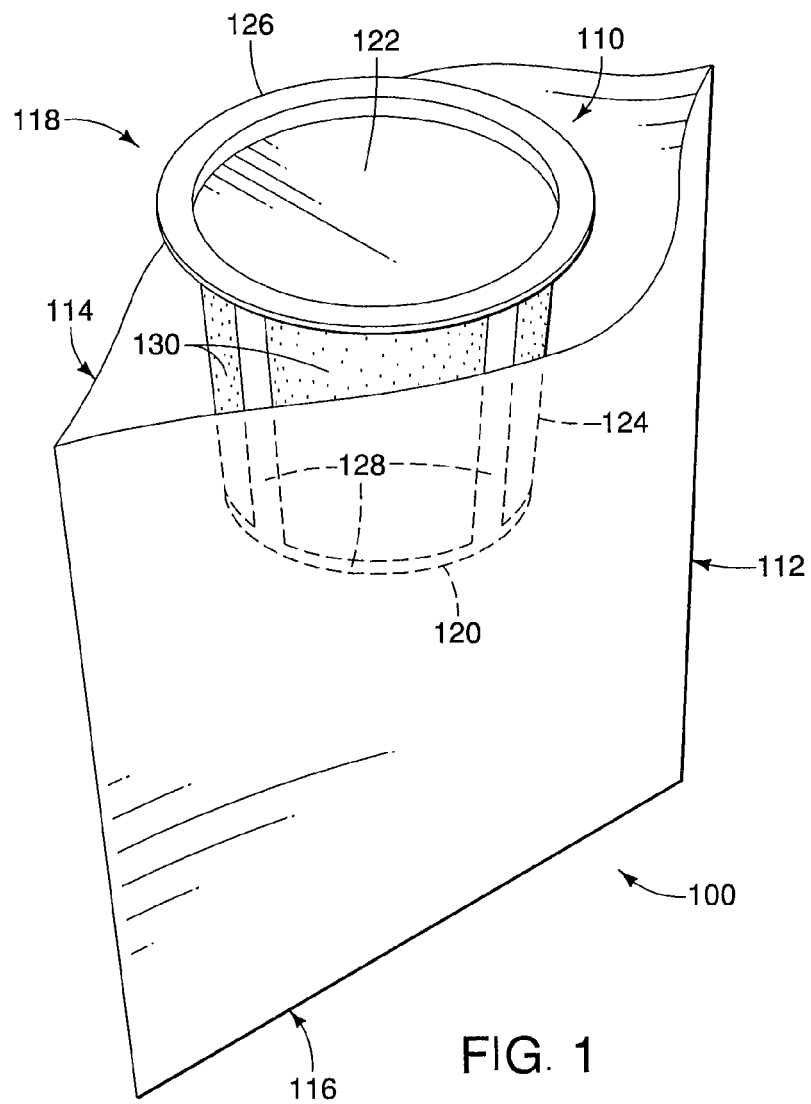
FIG. 1 illustrates a disposable beverage portion basket with packaging.

In FIG. 1, coffee or tea grounds for use in a single serving brewer may be packaged in a disposable single use beverage package 100. A disposable single use beverage package 100 may include a basket 110, which may be a permeable basket and barrier 112, which may be a disposable impermeable barrier.

The barrier 112 may have a first side 114 and a second side 116. The first side 114 may include a score, a tab, a zip, an embedded string, or otherwise provide a means for assisting a user to open the barrier 112. The barrier 112 may be sealed at the second side 116 or other sides by gusseting, pinching, heat sealing, stapling, or otherwise. Alternatively or additionally, the barrier 112 may be a shrink wrap barrier or a wax barrier, among others.

The barrier 112 may be substantially resistant to the passage of liquids, gases, and solids. For example, the barrier 112 may be hermetically sealed to block moisture and oxygen from entering the pouch and to retain the aroma of the coffee. Additionally or alternatively, several baskets may be prefilled and packaged together in an egg crate type configuration, a tube, or other packaging, to maintain freshness during shipping and storing. The barrier 112 may be made of materials such as foil laminate, metalized films, EVOH films, polyolefin based material, parafilm, plastics, and combinations of these, among others.

A user may open the package 100, for example, by tearing the barrier 112 along the first side 114 to reveal the basket 110. The user may remove the basket 110 from the barrier 112 and place the basket 110 into a single serve brewer. The basket 110 may be prefilled with grounds, or alternatively, the user may add grounds to the basket 110.

The basket 110 may be a single-wall permeable basket including a first end 118, which may be reversibly closed or an open end, and a second end 120, which may be a closed end. The basket 110 may be a cup shaped basket and may be used with a lid 122. The basket 110 may also have a side wall 124 and a rim 126. The side wall 124 may connect the second end 120 and the rim 126. The side wall 124 may include a frame 128 and a filter medium 130.

The frame 128 may provide structure, stability, and integrity to the filter medium 130. The frame 128 may be formed by injection molding or by a different process suitable for manufacturing a rigid form around a relatively flexible filter medium. The frame 128 may be made of any one of many commercially available materials, such as polystyrene, polyethylene, polypropylene, polyester, polyamide or Nylon, or other synthetic or natural plastics or combinations thereof. The frame 128 may be made from other materials such as a bio-based polymer, such as polylaticacid (PLA), poly hydroxybutaric acid (PHA) or a starch based polymer. The frame 128 may be made of other materials known to those skilled in the art.

Figure 2:
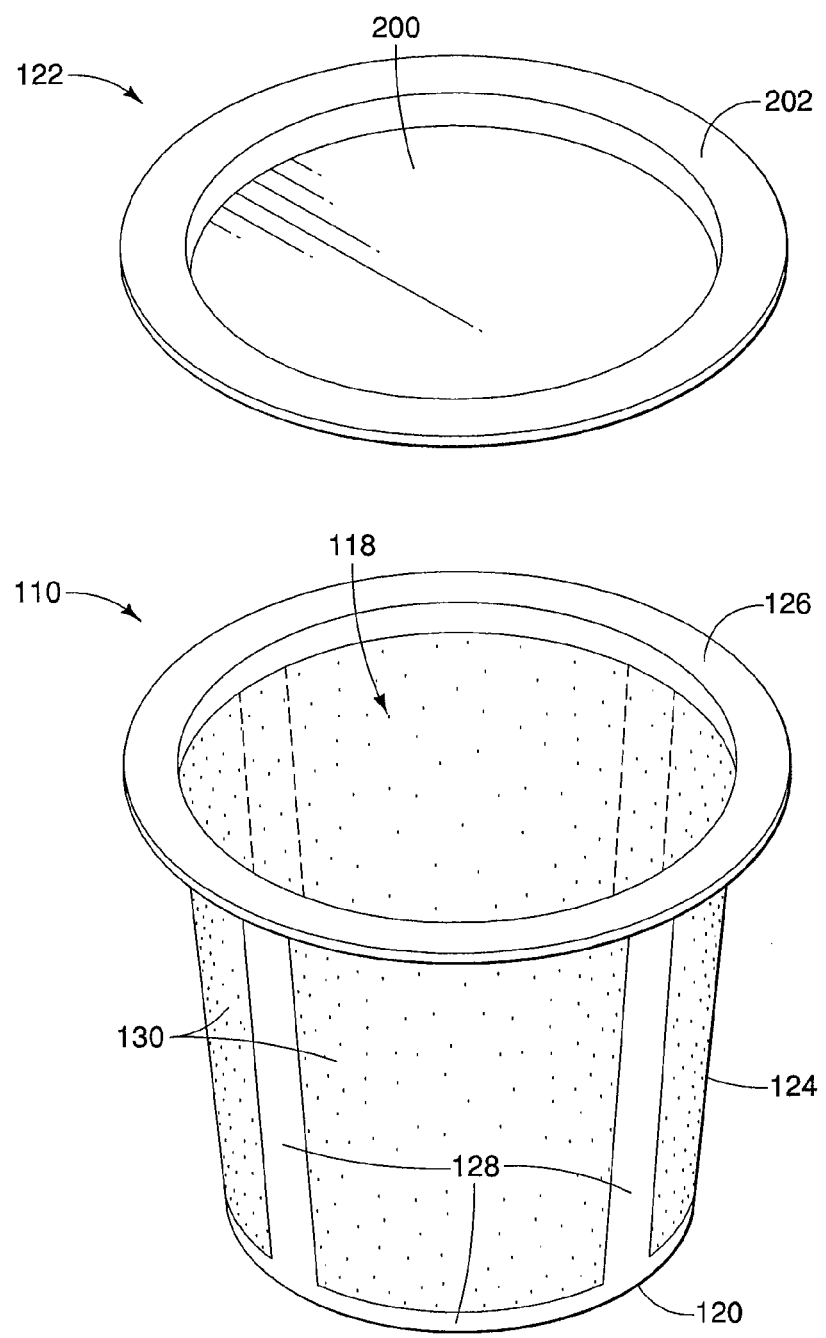
FIG. 2 illustrates a disposable beverage portion basket and lid.
Figure 7A:
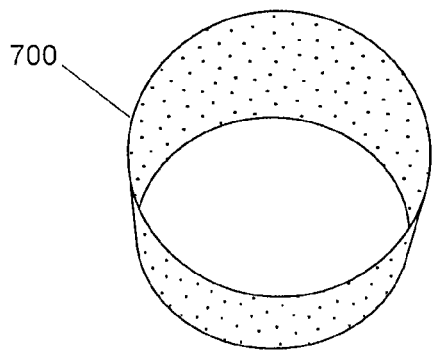
FIG. 7A illustrates an exemplary filter medium side portion configured to be molded into a basket.
Figure 7B:
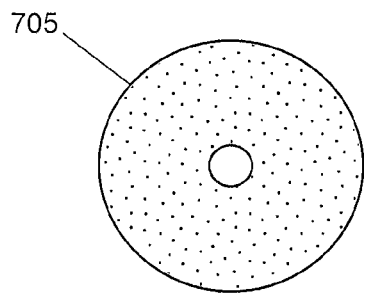
FIG. 7B illustrates an exemplary filter medium bottom portion, if needed, configured to be molded to a bottom surface of a frame of a basket.
Figure 7C:
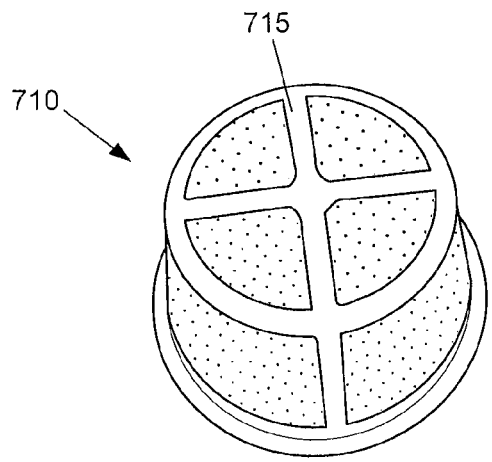
FIG. 7C illustrates an exemplary filter side portion and filter bottom portion molded to a basket.

In FIG. 2, the side walls 124 of the basket 110 may be defined by the frame 128 and a filter medium 130. The filter medium 130 may be secured to the basket 110, for example, at the second end 120, the rim 126, and/or at that frame 128. The filter medium 130 may be secured for example, by thermal bonding of the plastic used for the frame 128, or with an adhesive, by crimping, by heat sealing, or any other way. The filter medium 130 may be secured in the frame 128 in insert-injection molding of the plastic frame around a filter medium insert. For example, a pre-die cut blank of filter medium may be placed on a mandrel which has channels around the shape of the pre die-cut blank. Molten plastic may flow in and bond to the blank of the filter medium 130 during inert-injection molding. The plastic may solidify into the frame 128, for example, upon cooling. Referring to FIGS. 7A-7C, in an alternative embodiment the filter medium 700 and 705 may be first formed into a generally cylindrical and tapered portion 700 and an optional bottom circular filter medium 705 herein after referred to as the circular portion 705. The filter medium 700 and 705 may then be placed or inserted onto a mold for insert injection molding to form the basket 710 with the filter media 700 and 705 supported by the frame of the basket 710. The bottom end 715 of the frame of the basket 710 may be substantially open and a circular filter portion 705 may cover the open portions.

The filter medium 130 may be a porous material and may be permeable to liquids and some oils. It may be formed of many materials, for example, non-woven materials such as polystyrene, polyethylene, polypropylene, polylactic acid, cellulosic fibers, polyhydroxyalkanoates, thermoplastic starch, filter paper, other paper materials, polymer materials, a combination of these or any other material. The filter medium 130 may also be formed from a polymer or plastic filtration mesh, or microporous or apertured films made of various plastic materials, such as polypropylene, Nylon 6 and high density polyethylene or other materials known to those skilled in the art. Alternatively, the filter medium 130 may be formed from a bio-based polymer, such as polylatic acid (PLA), poly hydroxybutaric acid (PHA) or starch based polymer.

Characteristics of the filter medium 130 may be selected to meet the filtration needs of different products, such as ground coffee, tea powders or leaves, or other brewed products. For example, the basis weight, thickness, strand count, mesh size, flow rate and strength of the filter medium 130 may be selected based on the product to be brewed.

The filter medium 130 may be compostable, biodegradable, recycled, and/or recyclable. If the filter medium 130 is a non-woven material, it may have a greater resistance than, for example, a woven material or a metal filter. A non-woven filter medium 130 may retain water in the basket for longer than, for example, a woven or metal filter. The length of time that the water is retained in the basket with the grounds may influence the strength and therefore the taste profile of the resulting beverage. This may be because a woven material or a metal material may have technological limitations on the size of the openings there through. A non-woven material may not have the same technological limitations. Therefore, the difference may be that, in a woven material or metal material, the path of the water may be straight through the wall and in the non-woven material, the path may be indirect and convoluted.

The basket 110 may include a lid 122. The lid 122 may include a rim 202 and a cover 200. The cover 200 may be disposed below the rim 202 for secure fitting with the basket 110. Alternatively, the cover 200 may not include a rim 202. The cover 200 may be made from a material that may be punctured to allow a liquid to enter into the basket. For example, the cover 200 may be a material, such as a foil, film, coated film, or multilayer laminate, which is sealed to or across the rim 126 of the permeable basket 110 to maintain contents therein. The cover 200 may keep dry contents dry, wet contents wet, and may maintain a freshness of the contents. The cover 200 may be formed of a plastic, metallic foil, filter material, thermoplastic starch, or a laminate or composite thereof.

Figure 3:
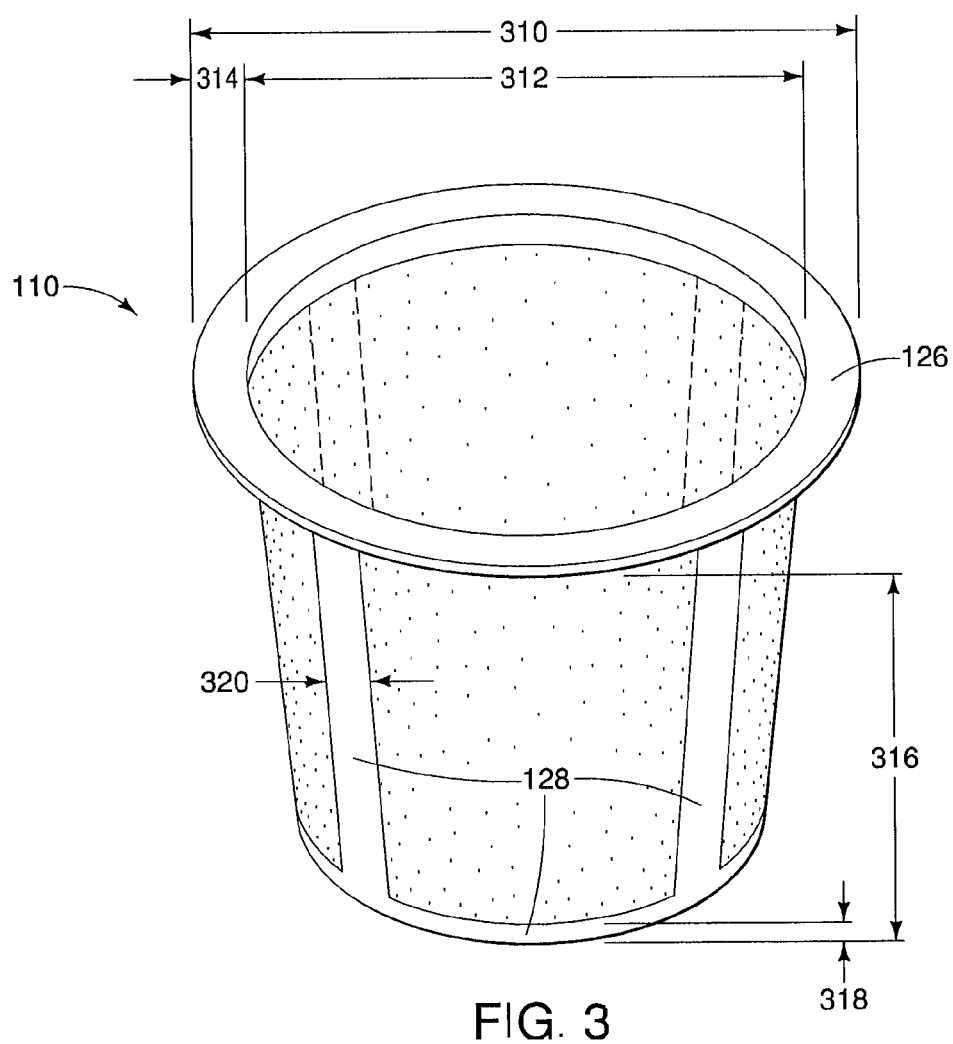
FIG. 3 illustrates a disposable beverage portion basket with exemplary dimensions.

The basket 110 may be dimensioned for use with a commercial single serve coffee brewer. FIG. 3 shows an exemplary basket 110. The basket 110 may have width of the open end 312, and a height 316. The open end 312 may be, for example but not limited to, about 38-42 mm. The height 316 may be, for example but not limited to, 38-42 mm. The rim 126 may have a dimension 314 of, for example but not limited to, 3.5-5.5 mm. The frame 128 may have a dimension 320 of, for example but not limited to, 5 mm, and a dimension 318 of, for example but not limited to 2 mm. These dimensions are merely exemplary and not limiting. The basket 110 may also have other dimensions or shapes, for example, dimensions that permit use in various single serve beverage machines.

Figure 4:
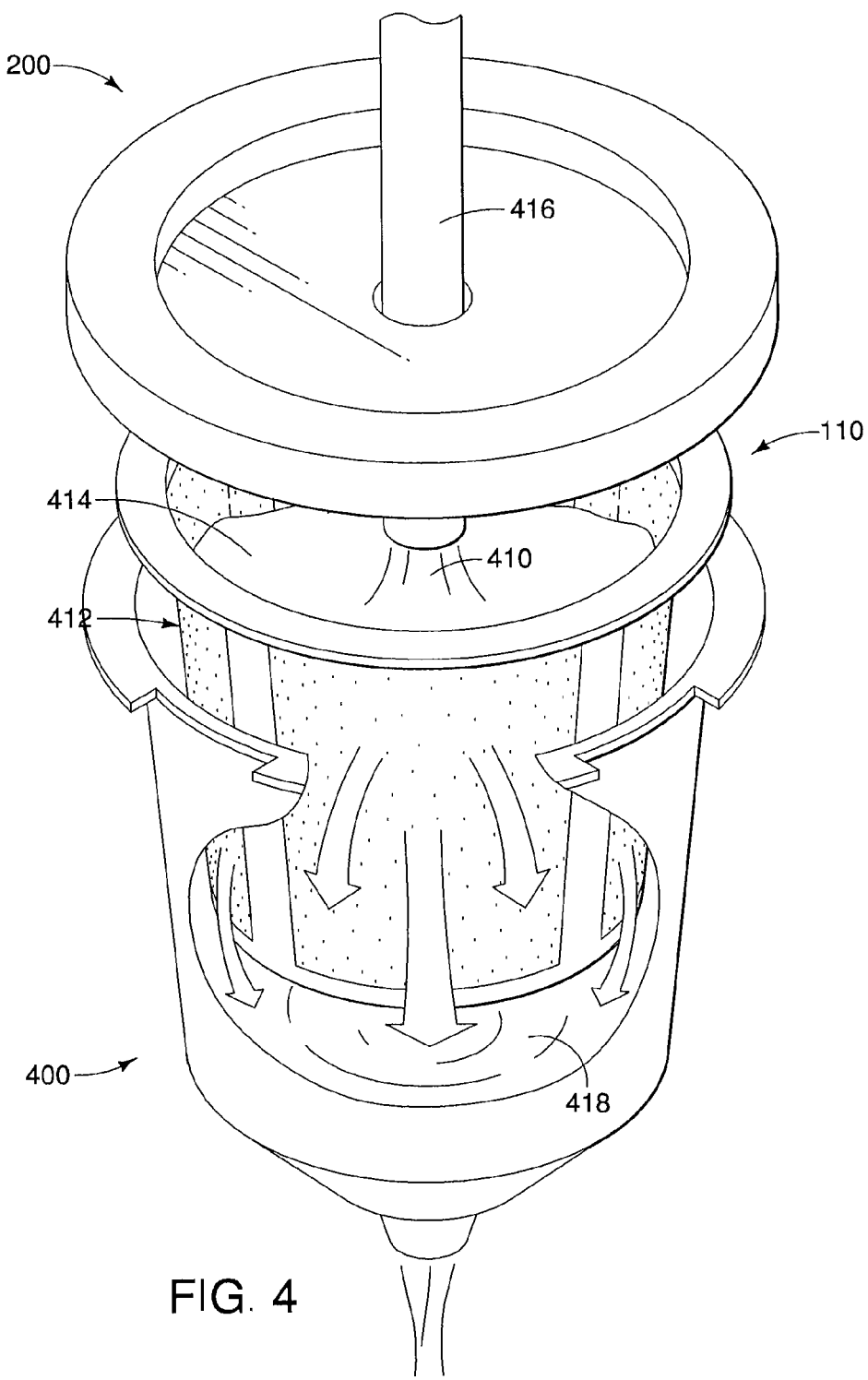
FIG. 4 illustrates use of a disposable beverage portion basket.

In FIG. 4, a basket 110 may be prefilled with beverage grounds 414, for example but not limited to, coffee or tea grounds. Alternatively or additionally, the basket 110 may be loaded with beverage grounds 414 immediately prior to use. If the basket 110 is prefilled with beverage grounds 414 it may be sealed with a lid 122. Alternatively, if the permeable basket 110 is not preloaded with beverage grounds 414, it may not have a lid 122, additionally or alternatively; it may have a removable lid 122, or otherwise.

During use, a user may open the barrier 112, take out the basket 110 and place the basket 110 into a single serve beverage machine. A heated liquid 410 may be received by the basket 110 through an opening in the cover 200 or otherwise. For example, during use, a preloaded basket 110 may be placed inside a cartridge 400 for a single serve beverage machine. The cartridge 400 may be reusable or disposable. During a brewing cycle, the cover 200 may be pierced by a probe 416 to admit heated liquid 410 into the basket 110. The heated liquid may interact with the beverage grounds 414 creating a beverage medium. The beverage medium 418 may flow through the filter medium 130 and exit through an opening in the cartridge 400.

As a second example, during use, an unloaded permeable basket 110 may be placed inside a cartridge 400 for a single serve beverage machine. The cartridge 400 may be reusable or disposable. The beverage grounds 414 may be placed into the basket 110. A cover 200 may be attached to maintain the contents of the basket 110. During a brewing cycle, the cover 200 may be pierced by a probe 416 to admit heated liquid 410 into the basket 110. The heated liquid may interact with the beverage grounds 414 creating a beverage medium. The beverage medium 414 may flow through the filter medium 130 and exit through an opening in the cartridge 400. Alternatively, no cover 200 may be required. In this case, the heated liquid 410 will flow directly into the basket 110.

Figure 5:
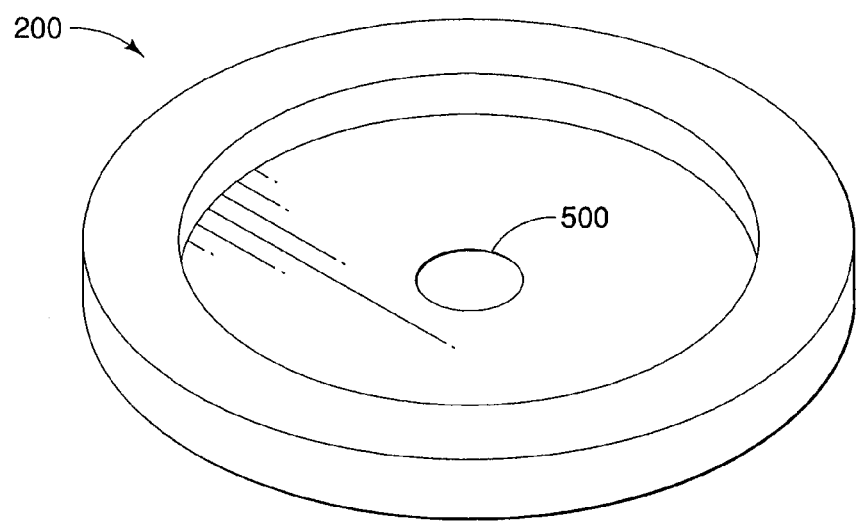
FIG. 5 illustrates an exemplary lid for a disposable beverage portion basket.

FIG. 5 illustrates one example of a lid 122 for a basket 110. The cover 200 of the lid 122 may include an opening 500 for entry of a liquid probe. The opening 500 may be a weakened portion of the material of the cover 200 which may give easily under the pressure of a probe.

Figure 6:
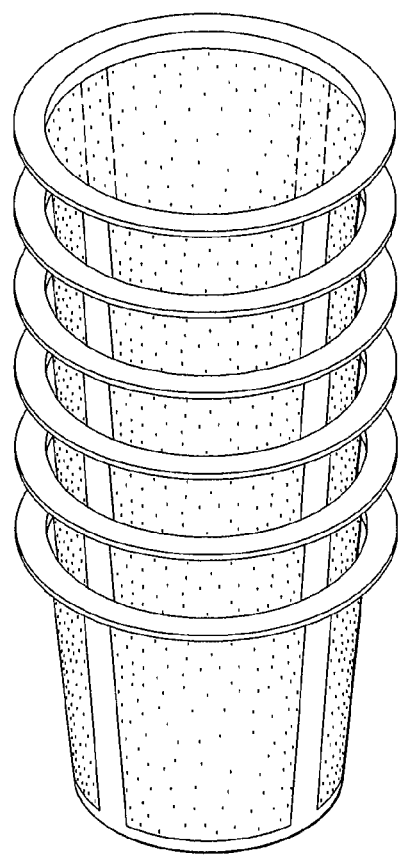
FIG. 6 illustrates an exemplary package of multiple disposable beverage portion baskets.

In FIG. 6, unloaded tapered baskets 110 may be configured for efficient nesting. The baskets 110 may be sold nested in a stack or tube, which may be packed in a sleeve of plastic film, or otherwise. The unloaded basket 110 may allow the end user to select a variety of beverage grounds 414 for use in their single serve brewer. The end user may also be able to modify the amount of beverage grounds 414 for use in their single serve brewer.

The components of the single use beverage package 100 may be selected with the intention of creating an environmentally friendly product. For example, the filter medium 130 may be made from a range of synthetic or biodegradable, recycled or recyclable, or compostable materials such as polyolefins, polylacticacid, cellulosics, polyhydroxyalkanoates, thermoplastic starch, a combination of these or other materials. The basket frame 128 material, cover 200 and barrier 112 may also be made out of these materials or similar synthetic, biodegradable, recycled or recyclable, or compostable materials which retain the properties of structural integrity (e.g., frame 128) and impermeability (e.g., barrier 112).

Figure 8A:
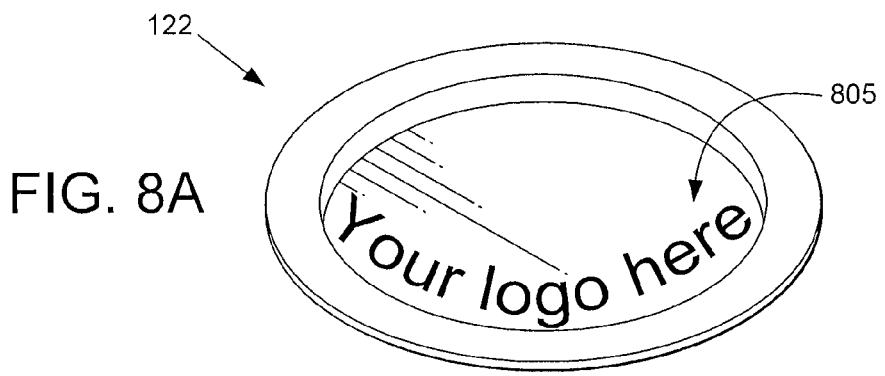
FIG. 8A illustrates the placement of a logo on the exemplary lid.
Figure 8B:
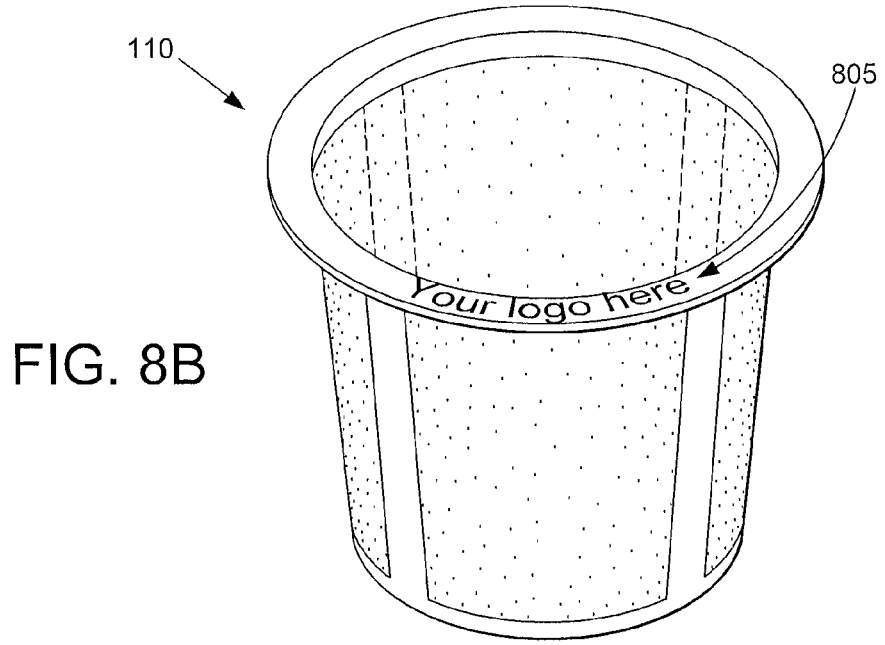
FIG. 8B illustrates the placement of a logo of the basket.
Figure 8C:
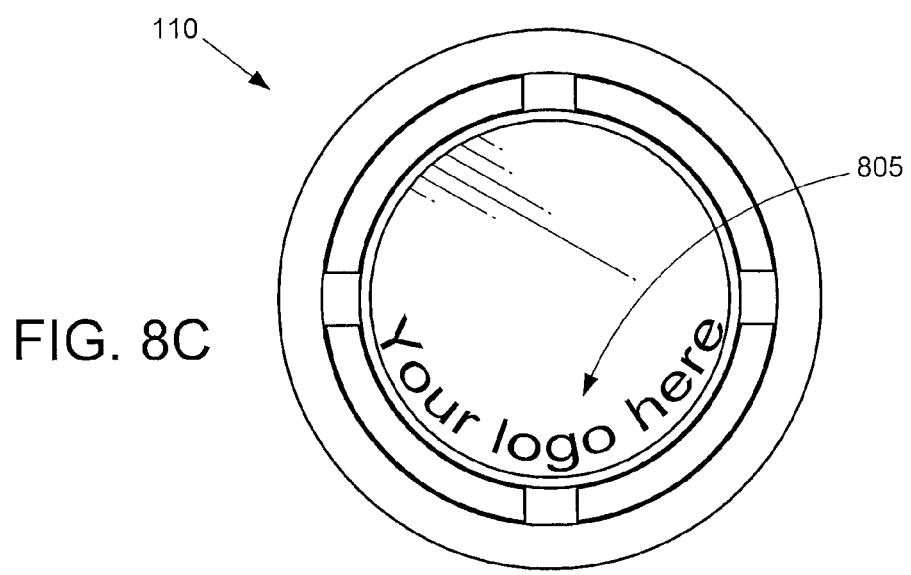
FIG. 8C illustrates the placement of a logo on underside of the basket.

While various embodiments of the embodiments have been described, it will be apparent to those of ordinary skill in the art that many more embodiments and implementations are possible that are within the scope of the claims. For example, referring to FIGS. 8A-8C, logos 805 of various configurations may be placed on the lid 122 (FIG. 9A), the basket 110 (FIG. 8B), or the underside of the basket 110. The logos 805 may also be printed on the filter medium 130. The logos 805 enable a vendor to, for example, place descriptive information about the product that is in the basket, such as whether the product is coffee or tea, a type of blend, and the like. Other information known to those skilled in the art may also be printed.

Figure 9A:
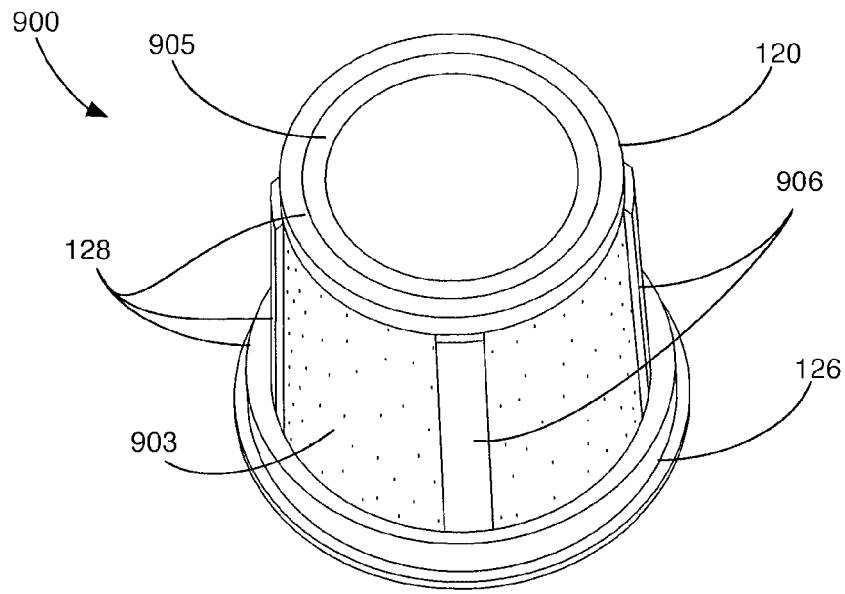
FIG. 9A illustrates a disposable beverage portion basket that defines a groove on a bottom portion.

FIGS. 9A-10B illustrate yet other embodiments of disposable beverage baskets. FIG. 9A and FIG. 9B illustrate beverage basket embodiments configured to control the positioning of the basket within a cartridge or brewer. Referring to FIG. 9A, the beverage basket 900 (shown upside down) includes a frame 128 and filter material 903. The frame 128 includes a rim 126, a bottom portion 120, and a group of ribs 906. The rim 126 defines an opening that corresponds to the top of the frame 128 when the frame 128 is in an upright position. The rim 126 may be continuous and have a circular shape, oval shape, or a different shape. The bottom portion 120 is a closed surface that corresponds to the bottom of the frame 128. The ribs 906 extend from the rim 126 to the edge of the bottom portion 120. The ribs 906, rim 126, and bottom portion 120 define a group of openings that facilitate fluid flow, such as coffee, tea, or a different beverage.

Figure 9B:
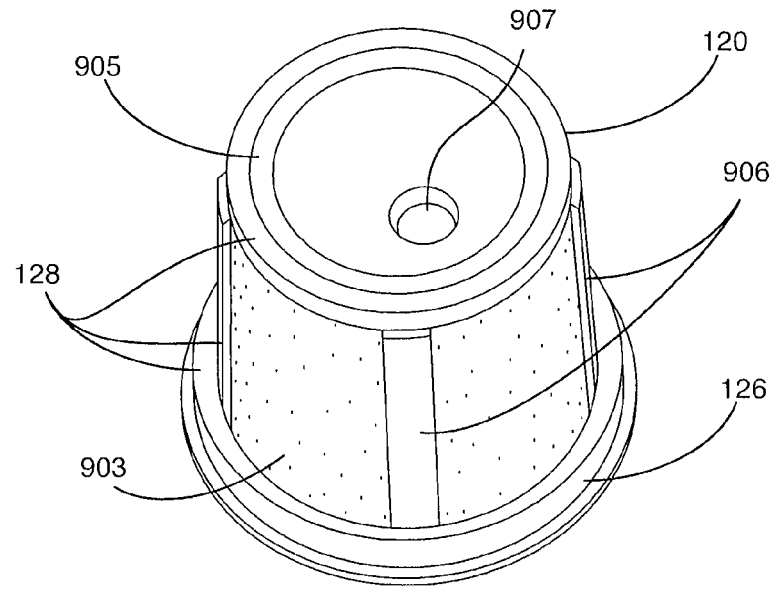
FIG. 9B illustrates a disposable beverage basket that defines a groove and indentation on a bottom portion.

The bottom portion 120 defines a groove 905 and/or an indentation 907 (See FIG. 9B). The groove 905 may extend in a continuous manner along and inward of the edge of the bottom portion 120. The groove 905 and/or indentation 907 are configured to cooperate with a complementary feature, e.g., a protruded needle in the bottom of a cartridge or brewer to accurately position the basket 900 within the cartridge or brewer. That is the groove 905 and/or indentation 907 are configured to mesh with a complementary feature of the cartridge or brewer to control alignment of the basket 900 so that the outer walls of the basket 900 are not up against inner walls of the cartridge or brewer during use, which could otherwise limit fluid flow through the basket 900.

Figure 10A:
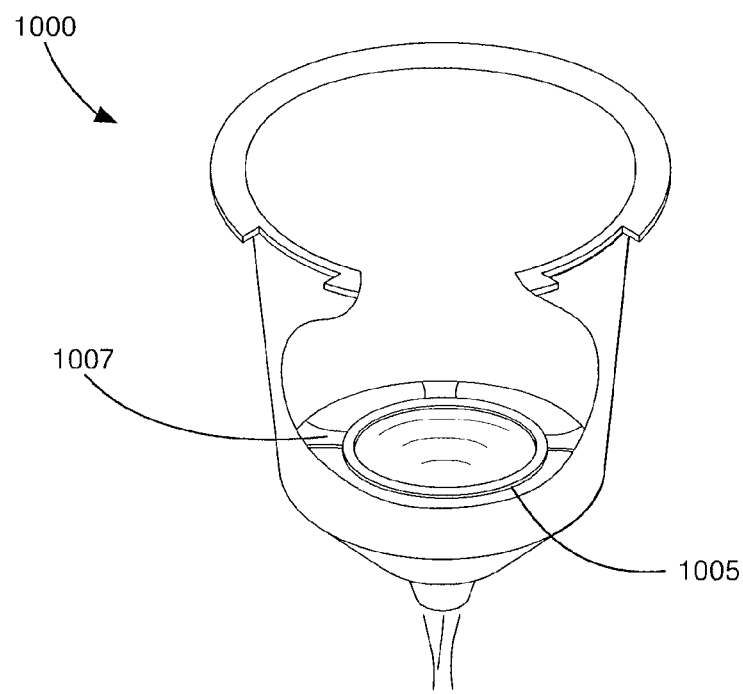
FIG. 10A illustrates an exemplary cartridge with an annular ring used in connection with the beverage basket of FIG. 9A.
Figure 10B:
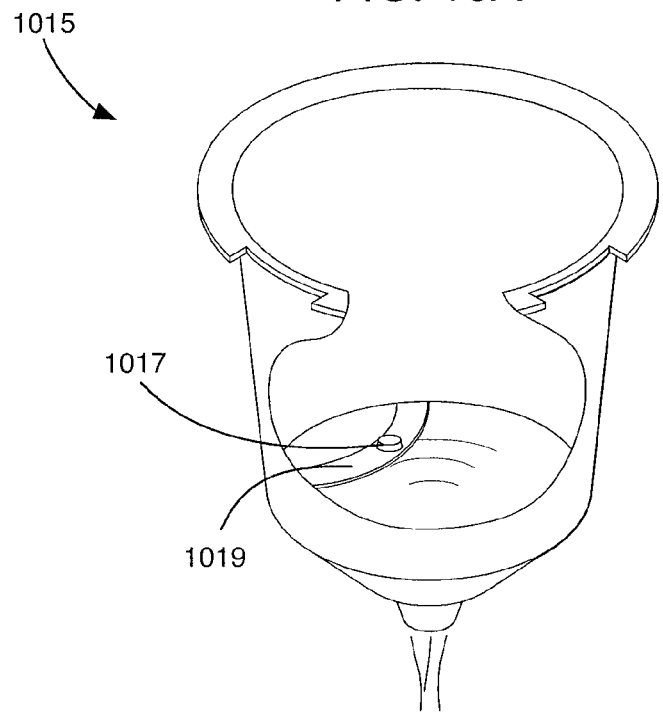
FIG. 10B illustrates an exemplary cartridge with a button used in connection with the beverage basket of FIG. 9B.

FIG. 10A and FIG. 10B, illustrate exemplary cartridges 1000 and 1015 with alignment features. The same alignment features may be provided in a brewer independently of a cartridge. Referring to FIG. 10A, the feature corresponds to an annular ring 1005. The annular ring 1005 may be suspended within the cartridge by one or more bridge members 1007 to facilitate fluid flow around the annular ring 1005. The annular ring 1005 may be sized to fit within the groove 905 of the beverage basket 900. In a brewer implementation, the annular ring 1007 may be formed in a portion of the brewer configured to receive the beverage basket 900. In other implementations, the annular ring 1005 and one or more bridge members 1007 may correspond to a separate component configured to fit substantially near the bottom of the cartridge 1000 or brewer and to maintain a distance between sidewalls of the cartridge 1000 or brewer.

Referring to FIG. 10B, the feature corresponds to a button 1017. The button 1017 may be sized to fit within the indentation 907, described above. The button 1017 may be supported by a bridge member 1019 to enable fluid flow around the button 1017. In a brewer implementation, the button 1017 may be formed in a portion of the brewer configured to receive the beverage basket 900. In other implementations, the button 1017 and bridge member 1019 may correspond to a separate component configured to fit substantially near the bottom of the cartridge 1015 or brewer and to maintain a distance between sidewalls of the cartridge 1015 or brewer.

Figure 11A:
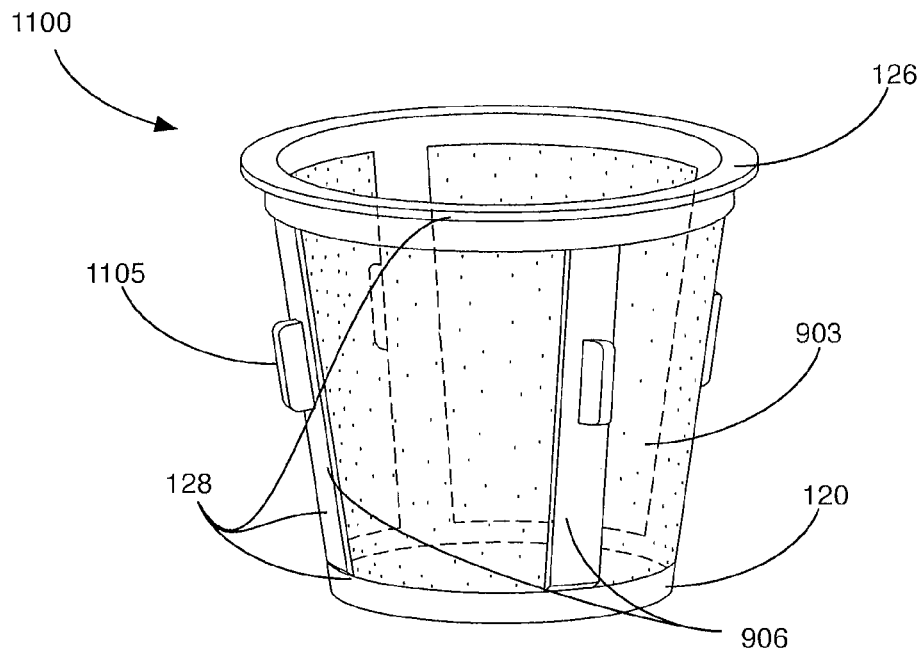
FIG. 11A illustrates a disposable beverage basket with a group of outwardly extending ledges.
Figure 11B:
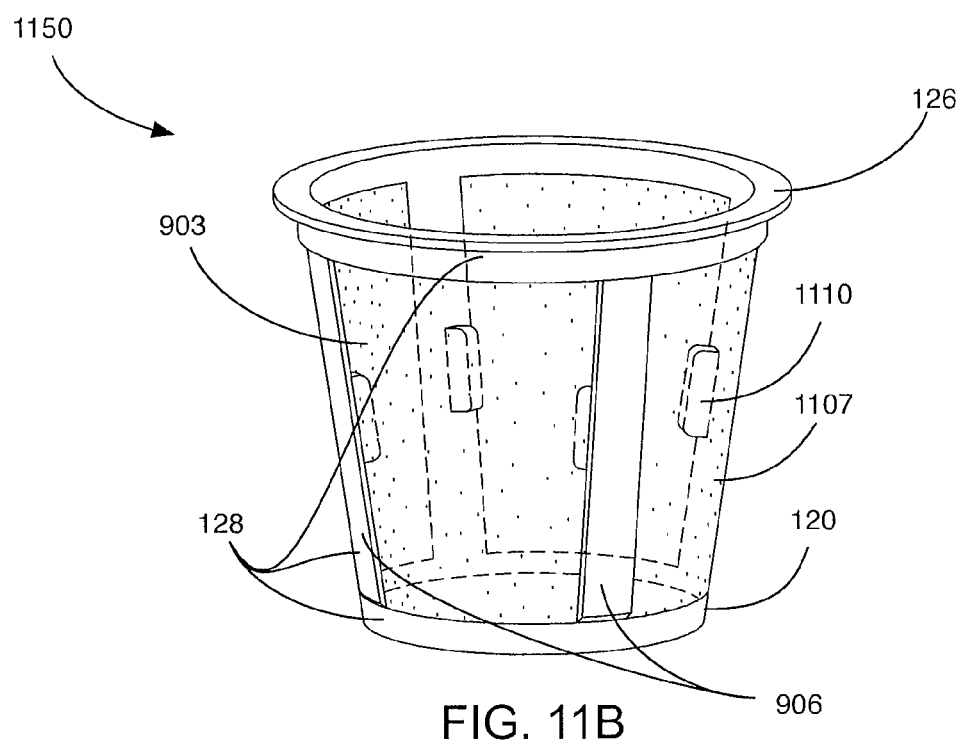
FIG. 11B illustrates a disposable beverage basket with a group of inwardly extending ledges

FIG. 11A and FIG. 11B illustrate beverage basket embodiments 1100 and 1150 configured to be stacked. Referring to FIG. 11A, the beverage basket 1100 includes a frame 128 and filter material 903, as describe above. For example, the frame includes a rim 126, a bottom portion 120, and a group of ribs 906. The rim 126 defines an opening that corresponds to the top a top of the frame 128. The rim 126 may be continuous and have a circular shape, oval shape, or a different shape. The bottom portion 120 is a closed surface that corresponds to the bottom of the frame 128. The ribs 906 extend from the rim 126 to the edge of the bottom portion 120. The ribs 906, rim 126, and bottom portion 120 define a group of openings that facilitate fluid flow, such as coffee, tea, or a different beverage.

Each rib 906 includes a ledge 1105 and 1110 (FIG. 11B) positioned in a center region. The ledges 1105 and 1110 are configured to limit an amount by which respective baskets 1100 and 1150 are insertable into one another. Limiting the insertion amount results in a space 1210 (FIG. 12B) between respective bottoms 120 of the baskets 1100 and 1150. The space 1210 may be sized to facilitate storage of beverage grounds, such as coffee ground, tea grounds, or other grounds, which the baskets 1100 and 1150 are stacked. That is, the position of the ledges 1105 and 1210 along the ribs 906 may be configured to result in a desired amount of space 1210 between respective baskets. Thus, several baskets may be advantageously filled with grounds and then stacked to save space.

Figure 12A:
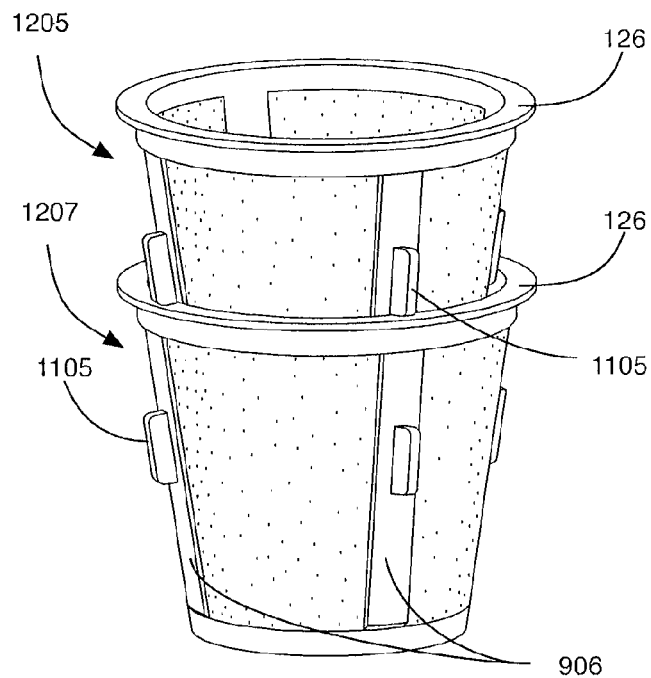
FIG. 12A illustrates stacking of disposable beverage baskets that include outwardly extending ledges.

In some configurations, the ledge 1105 extends outwardly away from the center of the basket. (See FIG. 11A). Referring to FIG. 12A, in this configuration, the ledge 1105 of a top basket 1205 rests upon the rim 126 of a lower basket 1207. In this regard, the distance between opposing ledges 1105 (i.e., ledges 1105 on opposite sides of the basket 1100) may be equal to about the inner diameter of the rim 126.

Figure 12B:
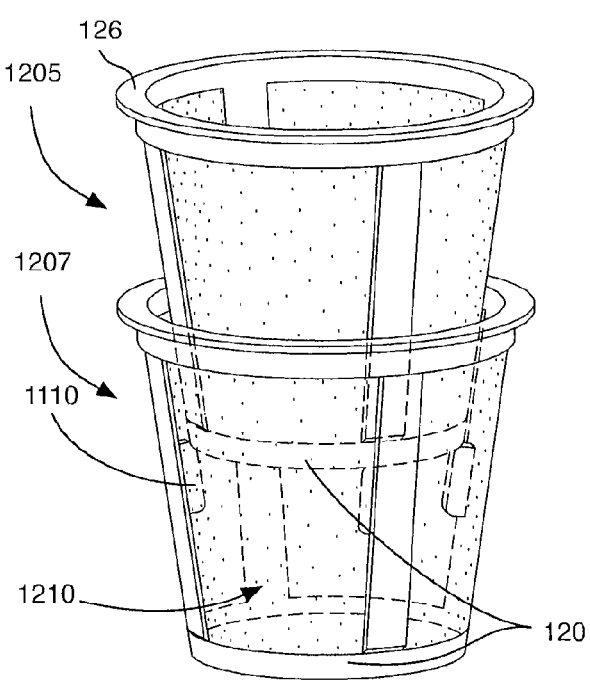
FIG. 12B illustrates stacking of disposable beverage portion baskets that include inwardly extending ledges.

In other configurations, the ledge 1110 extends inwardly towards the center of the basket. (See FIG. 11B). Referring to FIG. 12B, in this configuration, the bottom portion 120 of the top basket 1205 rests upon the ledge 1110 of the lower basket 1207. In this regard, the distance between opposing ledges 1110 (i.e., ledges 1105 on opposite sides of the basket 1100) may be equal to about the outer diameter of the bottom portion 120.

Figures 13A, 13B:
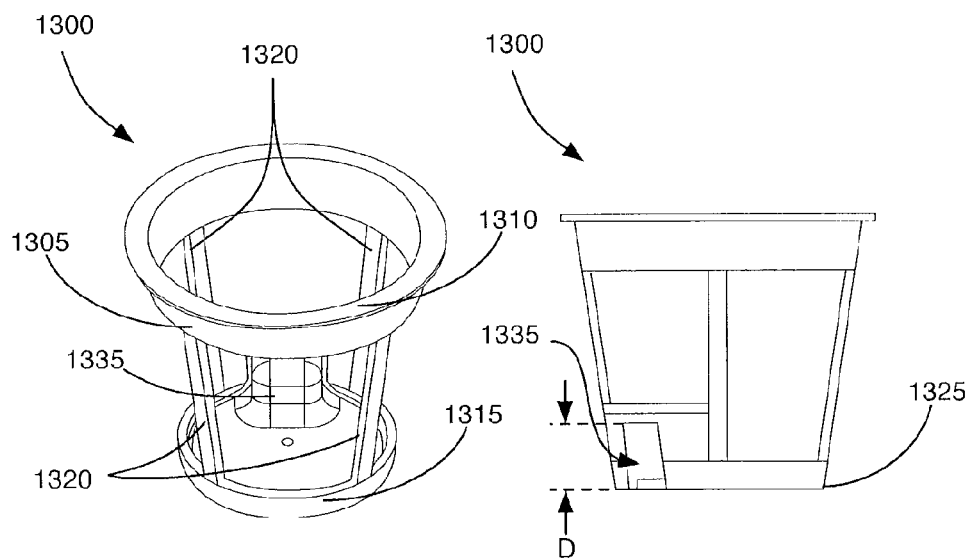
FIGS. 13A-13C illustrate perspective, side, and bottom views, respectively, of yet another beverage basket embodiment.
Figure 13C:
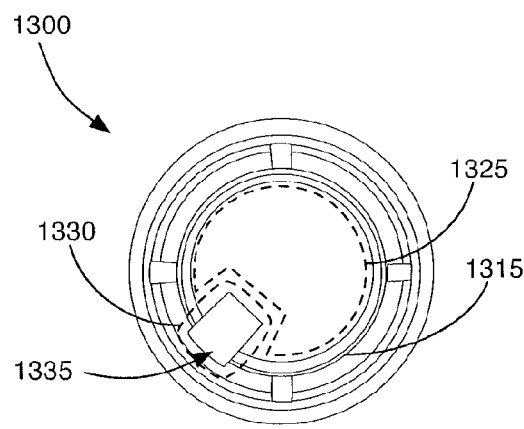

FIGS. 13A-13C illustrate perspective, side, and bottom views, respectively, of yet another beverage basket embodiment 1300. The beverage basket 1300 is configured to be placed into a brewer (not shown) without the need for a cartridge 400. Such brewers typically include a receiving member sized to receive a basket with a similar although not identical shape. A protruded membrane-piercing needle is positioned in the lower portion of the receiving member and is configured to pierce the lower portion of a typical plastic cup (e.g., a generally cylindrically shaped cup with a flat and closed bottom surface) so as to facilitate fluid flow out of the basket, through the needle, and then into a cup.

The beverage basket embodiment 1300 includes a frame 1305. The frame 1305 includes a rim 1310, a bottom portion 1315, and a group of ribs 1320. The rim 1310 defines an opening that corresponds to the top of the frame 1305 when the frame 1305 is in an upright position. The rim 1310 may be continuous and have a circular shape, oval shape, or a different shape. The bottom portion 1315 is a closed surface that corresponds to the bottom of the frame 1305. The ribs 1320 extend from the rim 1310 to the edge of the bottom portion 1315. The ribs 1320, rim 1310, and bottom portion 1315 define a group of openings that facilitate fluid flow, such as coffee, tea, or a different beverage. The beverage basket embodiment 1300 also includes a filter material that covers the openings, such as any of the filter materials described above, which is not shown in this instance for clarity.

A first portion 1325 (FIG. 13C) of the bottom portion 1315 is substantially flat. Whereas a second portion 1330 of the bottom portion 1315 defines an indentation 1335, which can be either fully enclosed or semi enclosed. The first portion 1325 may occupy ¾ or more of the surface area of the bottom portion 1315. The second portion 1330 may occupy the remaining area. The indentation 1335 is sized so that when the basket 1300 is inserted into the receiving member, the membrane-piercing needle fits within the indentation 1335 and does not pierce the bottom portion 1315. For example, a depth D of the indentation 1335 relative to the lower surface of first portion 1325 of the bottom surface may be, for example but not limited to, about 0.388". The width of the indentation 1330 may be, for example but not limited to, about 0.287", and the indentation 1335 may be offset towards a side edge of the bottom portion 1315, which corresponds to the location of the membrane-piercing needle in some brewer implementations. However, the indentation 1335 may be located in a different location when the membrane-piercing needle is positioned differently. Limiting the space occupied by the indentation 1335 (i.e., maximizing the space occupied by the first portion) results in more space within the basket 1300 for grounds, such as coffee grounds. This in turn facilitates the production of stronger blends.

FIGS. 14A-16B illustrate various exemplary lids for covering the beverage basket embodiment 1300. The respective lids are configured to selectively substantially seal the opening defined at the top of the frame 1305. FIGS. 14A and 14B illustrate a first exemplary lid 1400. The lid 1400 includes an opening 1402 in a center region through which a liquid flows into the basket 1300. The lid 1400 also includes an annular ring 1405 configured to be friction fit against an inner surface of the rim 1310 of the frame 1305 to thereby form a seal between the lid 1400 and the beverage basket 1300. That is, a seal between the outer surface of the annular ring 1405 and the inner surface of the rim 1310. The diameter of the annular ring 1405 may be sized to provide a tight fit between the lid 1400 and the basket 1300 while still facilitating removal of the lid 1400.

FIGS. 15A and 15B illustrate a second exemplary lid 1500. The lid 1500 includes an opening 1502 in a center region through which a liquid flows into the basket 1300. The lid 1500 includes a sidewall 1505 configured to be snap fit over an outer edge of the rim 1310. In other words, the seal between the lid 1500 and the beverage basket 1300 is formed between the inner surface of the sidewall 1505 and the outer surface of the rim 1310. The diameter of the sidewall 1505 may be sized to provide a tight fit between the lid 1500 and the basket 1300 while still facilitating removal of the lid 1500.

Figures 16A, 16B:
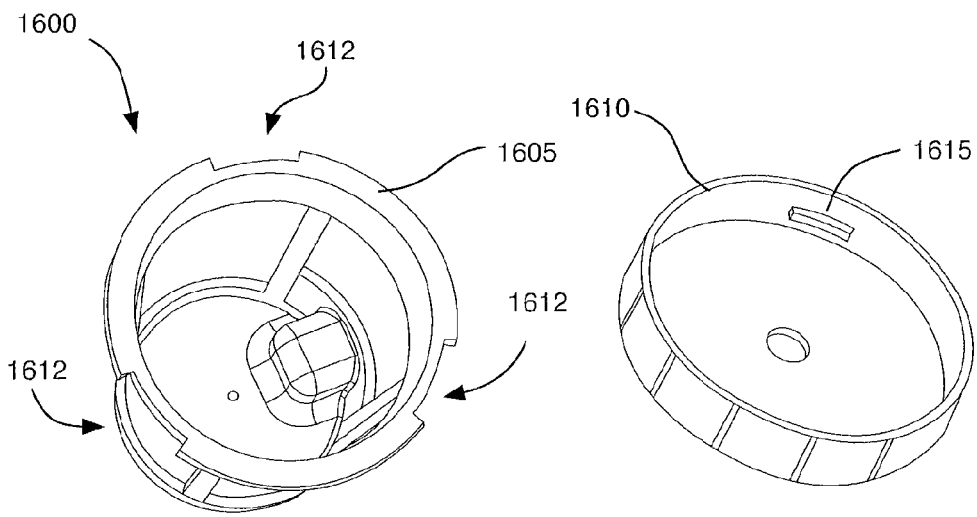
FIGS. 16A and 16B illustrate a basket and lid that twist lock together.

FIGS. 16A and 16B illustrate another exemplary beverage basket 1600 and lid 1610. The beverage basket 1600 includes the features of the beverage basket 1300 described above. However, the rim 1605 defines one or more cutouts 1612. The lid 1610 includes one or more tracks 1615 configured to cooperate with the one or more cutouts 1612 to facilitate twist locking of the lid 1610 to the beverage basket 1600. In this regard, the thickness of the rim 1605 may gradually increase with a distance away from the cutouts 1612 so that the tightness between the lid 1610 and the beverage basket 1600 increases with further twisting of the lid 1610.

Figure 17:
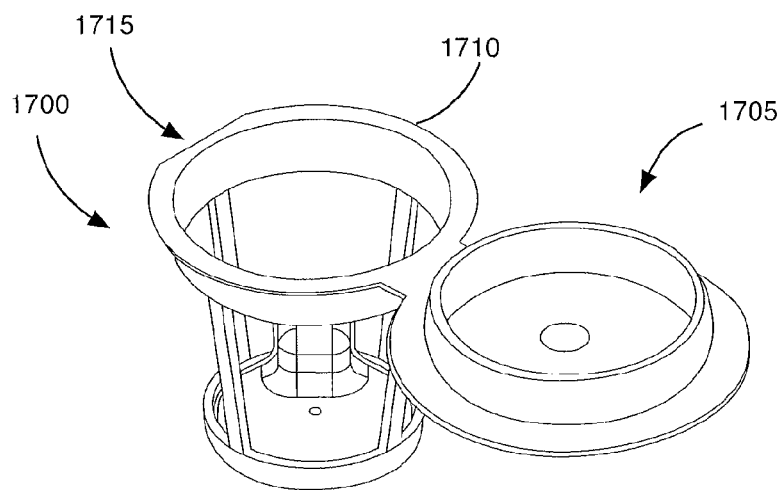
FIG. 17 illustrates a basket and lid formed together.

The configurations above may be varied. For example, as illustrated in FIG. 17, the basket 1700 and lid 1705 shown in FIG. 14 may be formed together so that in an open configuration the lid 1705 is attached to the basket 1700. The lid 1705 may then be folded over the basket 1700 to close the top opening of the basket 1700 defined by the rim 1710. A cutout 1715 may be formed in the rim 1710 to expose an underside of the lid 1705 when the lid 1400 is in the closed configuration. The cutout 1715 facilitates removal of the lid 1705 from the basket 1700.

Figure 18A:
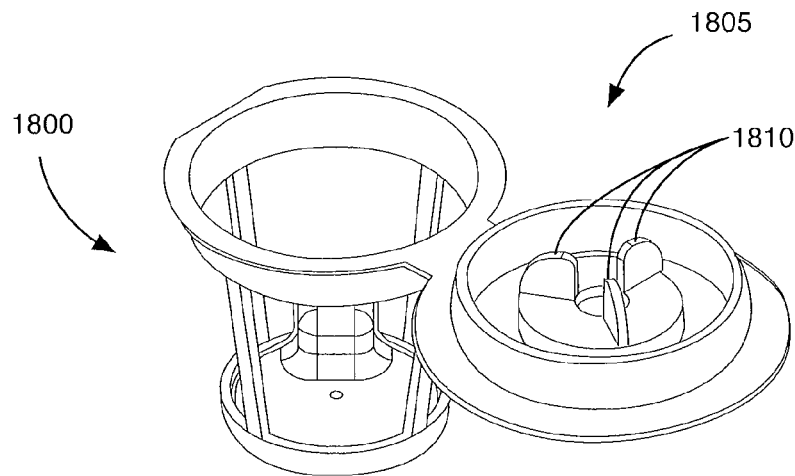
FIGS. 18A and 18B illustrates liquid distribution fins positioned on a lower surface of an exemplary lid.
Figure 18B:
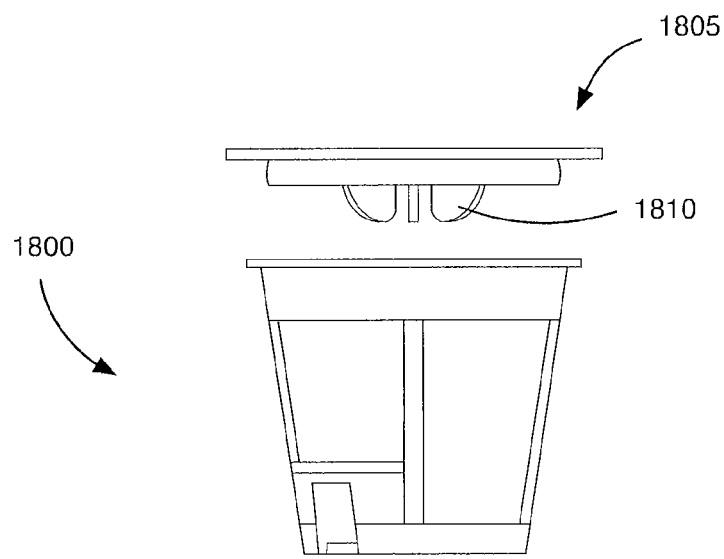

As illustrated in FIGS. 18A and 18B, liquid distribution fins 1810 may be formed on the underside of the lid 1805. During operation, liquid flowing into the lid opening will, through capillary pressure, be drawn over the liquid distribution fins 1810 and then drop onto the grounds in the basket 1800. The liquid distribution fins 1810 distribute the liquid over a larger portion of the grounds in the basket 1800 than would occur without the use of fins 1810. This in turn facilitates more even brewing of the beverage. It is understood that the shape and number of fins 1810 are only exemplary.

FIGS. 19A-20B illustrate a sealed beverage basket 1900 (FIG. 19C) and operations for forming the same. The sealed beverage basket 1900 includes a beverage basket wrapped in an outer sleeve that is made of a gas barrier material, such as aluminum foil, coated monolayer plastic films, multilayer laminates comprising of different plastic, aluminum foil, metalized plastic, metalized paper and coated films, which acts as a high gas barrier to gasses such as nitrogen ($N_2$), carbon-dioxide (CO), Oxygen ($O_2$) and other aroma organic volatiles. The outer sleeve is form fit to the beverage basket, which results in a smaller storage footprint. That is, the sealed beverage basket 1900 requires less space than some of the other embodiments.

The beverage basket may correspond to any of the described beverage basket embodiments. For example, the beverage basket may correspond to the basket 110 of FIG. 1. In this regard, the basket 110 includes a frame and filter medium, as described above. The frame includes a rim, a bottom portion, and a group of ribs. A lid 200 may be placed on the top of the frame 128 to secure contents within the frame 128.

FIG. 19A illustrates a first exemplary embodiment of an outer sleeve 1905 that may be placed around the outside surface of the basket 110 and subsequently form fit to the basket 110 to thereby provide a sealed beverage basket 1900. The outer sleeve 1905 is configured to cover at least the openings in the basket 110 through which fluid flows to thereby provide an air-tight seal within the basket 110. The air-tight seal preserves the freshness of contents stored within the basket 110.

In a pre-form fit stage, the sidewall of the outer sleeve 1905 may be tapered and the diameter sized to facilitate sliding of the basket 110 within the outer sleeve 1905. The diameter along a top edge of the outer sleeve 1905 may be sized to prevent the outer sleeve 1905 from extending passed the rim of the basket 110. The bottom of the outer sleeve 1905 may be opened or closed.

After sliding the basket 110 into the outer sleeve 1905, an inert gas, such as nitrogen, may be injected into the interior of the basket 110 to flush out ambient air. At the same time, heat may be applied to outer sleeve 1905 to cause the outer sleeve 1905 to shrink tightly around the basket 110 to thereby form an air-tight seal that prevents ambient air from entering the basket 110.

In some implementations, the outer sleeve 1905 may be configured to cover other areas of the basket 110. For example, the outer sleeve 1900 may cover a portion 1920 of the lid 200, as illustrated in FIG. 19C. In this case, the diameter of the top edge of the outer sleeve 1905 may be sized to allow the sleeve 1905 to slide above the rim in the pre-form fit stage. This allows the sleeve to fold over the lid 200 during the form fitting process, which further secures the lid 200 to the frame of the basket 110 and provides a means for detection of tampering with the contents stored within the basket 110. For example, a torn outer sleeve 1905 may evince tampering with the contents of the sealed beverage basket 1900.

FIG. 19B illustrates a second exemplary embodiment of an outer sleeve 1910 that may be placed around the outside surface of the basket 110 and subsequently form fit to the basket 110. Like the first outer sleeve embodiment 1905, the second outer sleeve embodiment 1910 is configured to cover at least the openings of the basket 110 through which fluid flows to thereby provide an air-tight seal within the basket 110. The air-tight seal preserves the freshness of contents stored within the basket 110. In some implementations, the outer sleeve 1910 may be configured to cover other areas of the beverage basket 1900, such as a portion 1920 of the lid 200, which may provide the advantageous features described above.

In the second embodiment, the outer sleeve 1910 is configured to be wrapped around the frame of the basket 110, as illustrated in FIG. 19B. In this regard, the outer sleeve 1910 is initially separated at first and second edges 1912 and is provided with an overlap amount, as illustrated by the dashed line 1915 in FIG. 19B. The first and second edges 1912 overlap one another when the outer sleeve 1910 is wrapped. An adhesive may be applied to one or both edges 1912 to facilitate joining of the edges. The adhesive may be a food grade peelable pressure sensitive adhesive that does not contaminate beverage grounds stored within the basket 110. For example, the adhesive can be acrylic based pressure sensitive adhesives. In some implementations, the edges 1912 may be joined through other suitable means, such as ultrasonic welding and the like.

The second outer sleeve embodiment 1910 may be cut from a sheet of sleeve material. Prior to cutting, graphics, labels, and the like may be printed on the sleeve material. This advantageously provides for a sealed beverage basket 1900 that includes graphics, labels, etc. on an outside surface. These in turn facilitate, for example, easy determination of the contents stored within the beverage basket 110, the manufacturer of the beverage basket, an expiration date, or any other desired information.

Figure 20A:
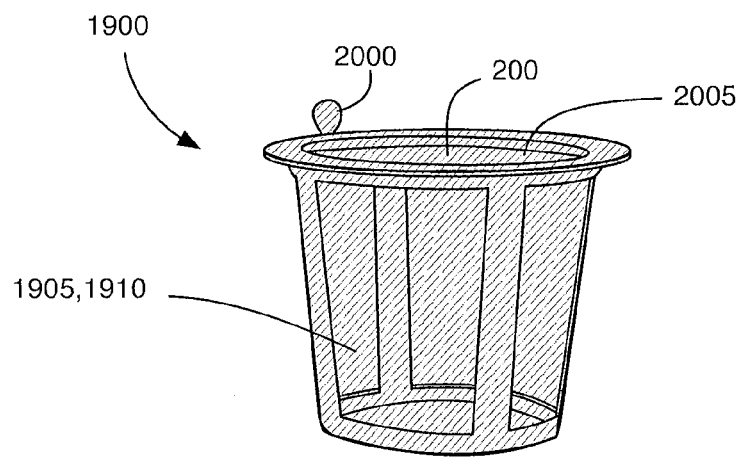
FIG. 20A illustrates a sealed beverage basket embodiment that includes a tab for removing an outer sleeve.
Figure 20B:
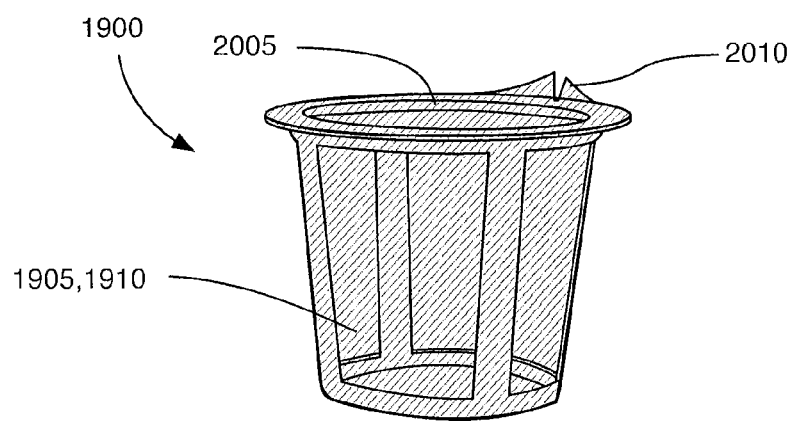
FIG. 20B illustrates a sealed beverage basket embodiment that includes a notch for removing an outer sleeve.

As illustrated in FIGS. 20A and 20B, in some implementations, the outer sleeve 1905, 1910 includes a top portion 2005 configured to completely cover the lid 200. The top portion 2005 may be formed from the same material as the rest of the outer sleeve 1905, 1910. For example, the first outer sleeve embodiment 1905 may be configured to have a closed top that corresponds to the top portion 2005 and may be configured (i.e., sized) to slide over the top of the basket 110 rather than the bottom. Alternatively, the top portion 2005 may be a separate portion joined to the rest of the outer sleeve 1905, 1910 via any of the joining processes described above, or different joining process. For example, the top portion may be joined via an adhesive, ultrasonic welding, or a different joining process.

In some implementations, the top portion 2005 may include a tab 2000 (FIG. 20A) or notch 2010 (FIG. 20B) to facilitate easy removal of the outer sleeve 1905, 1910 from the basket 110. In implementations that do not include a top portion 2005, the outer sleeve portion that covers the openings in the beverage basket may define the tab 2000 and/or notch 2010.

Figure 21A:
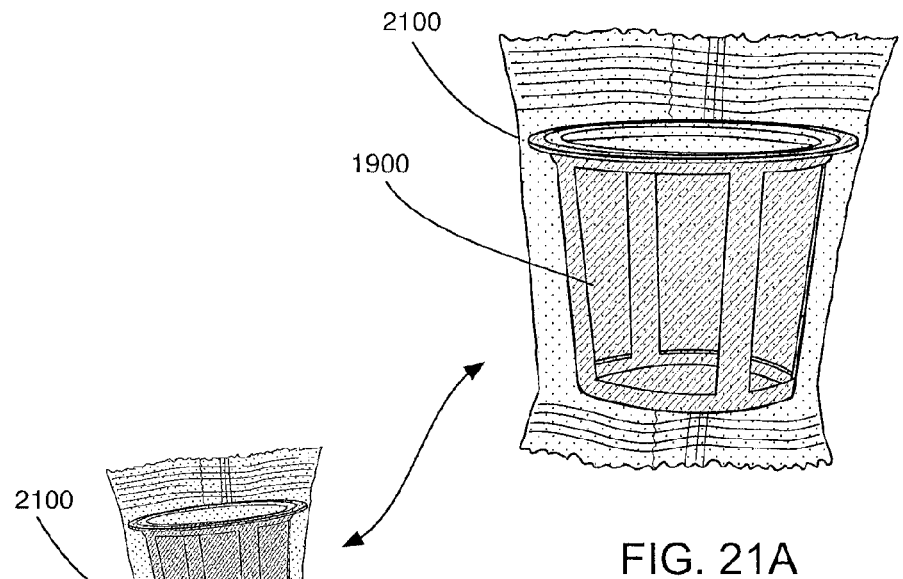
FIG. 21A illustrates a beverage packet.
Figure 21B:
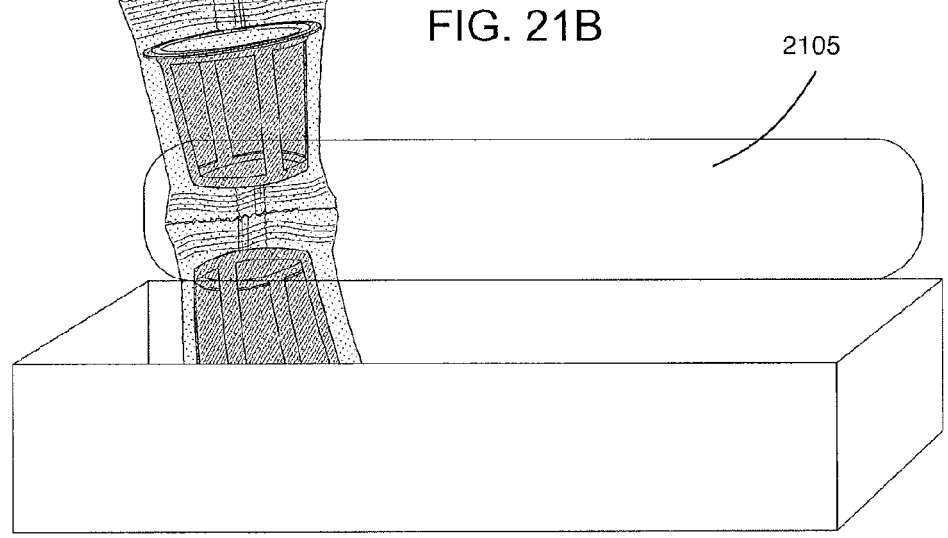
FIG. 21B illustrates a string of beverage packets.

FIG. 21A illustrates an exemplary beverage packet 2100 that may be used in connection with any of the basket embodiments described above. The beverage packet 210 is made from a flow wrap material that may be utilized to define a number of beverage packets 2100. Each beverage packet 2100 may include a sealed beverage basket, such as the sealed beverage basket 1900, described above. The flow wrap material may initially correspond to a tube closed at one end and with a length suited for packaging a desired number of sealed beverage baskets 1900.

In operation, a first sealed beverage basket 1900 is inserted into the tube. The tube is then sealed above the sealed beverage basket 1900 to form a first beverage packet 2100 that holds one sealed beverage basket 1900. A second sealed beverage basket 1900 is then inserted at the open end of the tube and sealed into the tube to provide a second beverage packet 2100. The operations continue until the desired number of beverage packets 2100 is obtained. The tube may be perforated between beverage packets 2100 to facilitate easy separation of the beverage packets 2100. The entire tube of beverage packet 2100 may be stored in a container 2105 for distribution and storage.

Accordingly, it will be apparent to those of ordinary skill in the art that many more embodiments and implementations are possible that are within the scope of the claims. Moreover, the described embodiments may be combined into new embodiments that provide any of the benefits described herein. Therefore, the embodiments described are only provided to aid in understanding the claims and do not limit the scope of the claims.

The invention claimed is:

1. A sealed beverage basket for holding beverage grounds comprising:
   a frame having an outside surface which includes:
      a continuous rim that defines an opening at a top of the frame;
      a bottom portion that is closed;
      a plurality of spaced apart ribs that extend from the rim to a peripheral edge of the bottom portion, wherein the bottom edge, plurality of ribs and rim define a plurality of openings that facilitate fluid flow;
   a filter material positioned in the plurality of openings, the filter material formed of a same plastic material as the frame;
   a lid member that covers the opening at the top of the frame to thereby secure the beverage grounds within the frame; and
   a removable, unitary and pre-formed outer sleeve shrink-fitted to the outside surface of the frame to cover at least the plurality of openings to thereby provide a form-fitted sleeve about the frame and an air-tight seal within the frame;
   wherein the outer sleeve is a pre-formed and discontinuous sleeve that includes first and second overlapping edges joined via an adhesive, said discontinuous sleeve wrapped about and shrink-fitted to the outside surface of the frame after the edges are joined to thereby form an air-tight seal within the frame.

2. The basket according to claim 1, wherein the outer sleeve is formed at least partially over the lid member.

3. The basket according to claim 1, wherein the adhesive is a food grade adhesive.

4. The basket according to claim 1, wherein the outer sleeve defines a tab or notch that facilitates peeling of the outer sleeve from the frame.

5. The basket according to claim 1, wherein the removable outer sleeve is removable from the frame thereby uncovering at least the plurality of openings without removing the lid member.

6. An air-tight beverage package comprising:
   a tube of unitary flow wrap material that defines a plurality of sealed pockets; and
   a sealed beverage basket for storing beverage grounds, a respective beverage basket positioned within each sealed pocket, wherein each beverage basket includes:
   a frame that includes:
      a continuous rim that defines an opening at a top of the frame;
      a bottom portion that is closed; and
      a plurality of spaced apart ribs that extend from the rim to a peripheral edge of the bottom portion, wherein the bottom edge, plurality of ribs and rim define a plurality of openings that facilitate fluid flow;
   a filter material formed of a same plastic material as the frame and positioned in the plurality of openings;
   a lid member that covers the opening at the top of the frame to thereby secure the beverage grounds within the frame; and
   a removable, unitary and pre-formed outer sleeve shrink-fitted to an outside surface of the frame configured to cover at least the plurality of openings to thereby provide a form-fitted sleeve about the frame and an air-tight seal within the frame;

wherein the outer sleeve is a pre-formed and discontinuous sleeve that includes first and second overlapping edges joined via an adhesive, said discontinuous sleeve wrapped about and shrink-fitted to the outside surface of the frame after the edges are joined to thereby form an air-tight seal within the frame.

7. The beverage package according to claim 6, wherein the tube of flow wrap material is perforated between adjacent pockets to facilitate controlled separation of the pockets.

8. The beverage package to claim 6, wherein the outer sleeve is formed at least partially over the lid member.

9. The beverage package according to claim 6, wherein the adhesive is a food grade adhesive.

10. The beverage package according to claim 6, wherein the outer sleeve defines a tab that facilitates peeling the outer sleeve from the basket.

11. The beverage package according to claim 6, wherein the outer sleeve defines a notch that facilitates peeling the outer sleeve from the basket.

12. A method for forming an air-tight beverage basket for holding beverage grounds comprising:
   forming a frame that includes a continuous rim that defines an opening at a top of the frame, a bottom portion that is closed, and a plurality of spaced apart ribs that extend from the rim to a peripheral edge of the bottom,
   wherein the bottom portion, plurality of ribs and rim define a plurality of openings that facilitate fluid flow;
   positioning a filter material in the plurality of openings, said filter material of the same plastic material as the frame;
   providing a lid member that covers the opening at the top of the frame thereby securing the beverage grounds within the frame; and
   forming a removable outer sleeve on an outside surface of the frame configured to cover at least the plurality of openings to thereby provide an air-tight seal within the frame; wherein forming the outer sleeve comprises:
   providing a preformed, unitary sleeve configured to slide over the frame;
   injecting an inert gas into an interior space of the frame to thereby remove ambient air from within the interior space; and
   simultaneously applying heat to the outer sleeve to thereby shrink the outer sleeve onto and around the frame;
   wherein the outer sleeve is a wrap-around sleeve with first and second ends, and the method further comprises: applying an adhesive on at least one of the first and second ends; wrapping the outer sleeve around the basket until one end overlaps the other end to thereby join the opposite ends; injecting an inert gas into an interior space of the frame to thereby remove ambient air from within the interior space; and simultaneously applying heat to the outer sleeve to thereby shrink the outer sleeve around the frame.

13. The method according to claim 12, wherein the adhesive is a food grade adhesive.

14. The method according to claim 12, wherein the outer sleeve defines a tab or notch that facilitates peeling the outer sleeve from the frame.

15. The method according to claim 12 further comprising forming a plurality of sealed pockets using a tube of a unitary flow wrap material, wherein the plurality of sealed pockets each contains a sealed beverage basket with removable outer sleeve and lid member.

16. The method according to claim 12 further comprising:
   inserting the beverage basket into a tube of a unitary flow wrap material;
   sealing the tube of flow wrap material at a top side of the frame; and
   sealing the tube of flow wrap material at a bottom side of the frame thereby forming a sealed pocket of the tube of flow wrap material.

* * * * *